United States Patent
Verma et al.

(10) Patent No.: US 11,704,684 B2
(45) Date of Patent: Jul. 18, 2023

(54) SYSTEM, METHOD, AND COMPUTER PROGRAM PRODUCT FOR DETERMINING A DOMINANT ACCOUNT PROFILE OF AN ACCOUNT

(71) Applicant: Visa International Service Association, San Francisco, CA (US)

(72) Inventors: Varun Verma, Singapore (SG); Manish Awasthi, Singapore (SG); Roan Joy Halili Cuares, Singapore (SG)

(73) Assignee: Visa International Service Association, San Francisco, CA (US)

(*) Notice: Subject to any disclaimer, the term of this patent is extended or adjusted under 35 U.S.C. 154(b) by 126 days.

(21) Appl. No.: 16/959,564

(22) PCT Filed: Jan. 4, 2018

(86) PCT No.: PCT/US2018/012322
§ 371 (c)(1),
(2) Date: Jul. 1, 2020

(87) PCT Pub. No.: WO2019/135749
PCT Pub. Date: Jul. 11, 2019

(65) Prior Publication Data
US 2021/0073838 A1    Mar. 11, 2021

(51) Int. Cl.
*G06Q 30/0204* (2023.01)
*G06Q 40/12* (2023.01)
(Continued)

(52) U.S. Cl.
CPC ........ *G06Q 30/0204* (2013.01); *G06Q 10/10* (2013.01); *G06Q 30/0224* (2013.01); *G06Q 40/02* (2013.01); *G06Q 40/12* (2013.12)

(58) Field of Classification Search
None
See application file for complete search history.

(56) References Cited

U.S. PATENT DOCUMENTS

| | | | |
|---|---|---|---|
| 7,958,142 B2 * | 6/2011 | Li | G06Q 30/02 715/240 |
| 2011/0035280 A1 * | 2/2011 | Fordyce, III | G06Q 20/384 707/602 |

(Continued)

FOREIGN PATENT DOCUMENTS

| WO | 2008067543 A2 | 6/2008 | |
|---|---|---|---|
| WO | WO-2008067543 A2 * | 6/2008 | G06Q 30/02 |

OTHER PUBLICATIONS

Earn 3X Credit Card rewards, Huntington webpages, archives org, Dec. 29, 2017 https://web.archive.org/web/20171229015518/https://www.huntington.com/Personal/voice-credit-card/credit-card-rewards (Year: 2017).*

(Continued)

*Primary Examiner* — Octavian Rotaru
(74) *Attorney, Agent, or Firm* — The Webb Law Firm

(57) ABSTRACT

Provided is a computer-implemented method for determining a dominant account profile of an account. The method may include receiving transaction data associated with a plurality of payment transactions conducted within a predetermined time interval of activation of an account involved in the plurality of payment transactions, generating a dominant account profile classification model, determining a plurality of prediction scores for the account based on the dominant account profile classification model and the transaction data, where determining the plurality of prediction scores includes determining, for the user, a prediction score for each dominant account profile, where a prediction score includes a prediction of whether the user will conduct a threshold value of payment transactions using the account in one or more payment transaction categories of a plurality of payment transaction categories, and communicating data associated with the plurality of prediction scores.

15 Claims, 5 Drawing Sheets

(51) Int. Cl.
*G06Q 10/10* (2023.01)
*G06Q 30/0207* (2023.01)
*G06Q 40/02* (2023.01)

(56) References Cited

U.S. PATENT DOCUMENTS

| | | | | |
|---|---|---|---|---|
| 2012/0066045 | A1* | 3/2012 | Schmitt | G06Q 40/02 |
| | | | | 705/14.25 |
| 2012/0157042 | A1* | 6/2012 | McCanna | H04M 15/83 |
| | | | | 455/407 |
| 2013/0151388 | A1* | 6/2013 | Falkenborg | G06Q 40/02 |
| | | | | 705/35 |
| 2013/0275186 | A1* | 10/2013 | Olives | G06Q 20/102 |
| | | | | 705/7.39 |
| 2014/0172559 | A1* | 6/2014 | Caiman | G06Q 20/3224 |
| | | | | 705/26.9 |
| 2015/0161645 | A1* | 6/2015 | Unser | G06Q 30/0226 |
| | | | | 705/14.27 |
| 2017/0039637 | A1* | 2/2017 | Wandelmer | G06Q 40/03 |
| 2019/0130432 | A1* | 5/2019 | Unnerstall | G06Q 20/363 |

OTHER PUBLICATIONS

Singh et al., "Increasing Debit Card Utilization and Generating Revenue using SUPER Segments", fiserv., 2011, 8 pages.

* cited by examiner

US 11,704,684 B2

SYSTEM, METHOD, AND COMPUTER PROGRAM PRODUCT FOR DETERMINING A DOMINANT ACCOUNT PROFILE OF AN ACCOUNT

CROSS-REFERENCE TO RELATED APPLICATION

This application is the United States national phase of International Application No. PCT/US2018/012322 filed Jan. 4, 2018, the disclosure of which is hereby incorporated by reference in its entirety.

BACKGROUND

1. Technical Field

This disclosure relates generally to systems, devices, products, apparatus, and methods that are used for determining a dominant account profile of an account, and in non-limiting embodiments, to a system, product, and method for determining a dominant account profile of an account associated with a user.

2. Technical Considerations

A business (e.g., a merchant) may be classified by the type of goods or services provided by the business according to a merchant category. For example, a merchant category code (MCC) (e.g., a four-digit number listed in the International Organization for Standardization (ISO) standard 18245 for retail financial services) may be used to classify the merchant based on the merchant category of the merchant. A MCC may be assigned based on a type of classification of the merchant (e.g., a type of classification for a hotel, a merchant category for a hotel, a type of classification for an office supply store, a merchant category for an office supply store, and/or the like) and/or by a name of the merchant (e.g., a MCC of 3000 for United Airlines).

In some examples, a MCC may be assigned to a merchant by a transaction service provider (e.g., credit card company) when the merchant first starts accepting credit cards and/or debit cards as a form of payment. Additionally or alternatively, a MCC may be used by a financial institution and/or a merchant to determine how to provide offers (e.g., offers associated with loyalty program rewards, offers associated with loyalty program points, and/or the like) to a customer to encourage the customer to conduct a payment transaction involving a merchant that has the MCC using an account (e.g., a credit account, a debit account, a credit card account, a debit card account, and/or the like).

However, a financial institution and/or a merchant may be unable to accurately determine an alignment between the account and a merchant category having a MCC in which a customer is likely to conduct a payment transaction using the account. For example, the financial institution and/or the merchant may be unable to accurately determine a MCC in which the customer is likely to conduct a payment transaction because the financial institution and/or the merchant did not take into consideration that a user did not make purchases in a merchant category associated with the MCC or did not make purchases at a merchant in a merchant category associated with the MCC during a time interval (e.g., a day, a week, and/or the like). Accordingly, the financial institution and/or the merchant may communicate offers to the customer that are ineffective at encouraging the customer to conduct a payment transaction in a merchant category associated with a MCC. By communicating offers that are ineffective, network resources and/or processing resources may be wasted as compared to communicating a smaller number of offers that are effective.

SUMMARY

Accordingly, improved systems, devices, products, apparatus, and/or methods for determining a category alignment of an account are disclosed.

According to some non-limiting embodiments, provided is a method for determining a dominant account profile of an account. The method comprises receiving, with at least one processor, transaction data, wherein the transaction data is associated with a plurality of payment transactions conducted within a predetermined time interval of activation of an account involved in the plurality of payment transactions, wherein the plurality of payment transactions involve a user associated with the account; generating, with at least one processor, a dominant account profile classification model; and determining, with at least one processor, a plurality of prediction scores for the account based on the dominant account profile classification model and the transaction data, wherein determining the plurality of prediction scores comprises: determining, with at least one processor, for the user, a prediction score for each dominant account profile of a plurality of dominant account profiles, wherein a prediction score for a dominant account profile comprises a prediction of whether the user will conduct a threshold value of payment transactions using the account in one or more payment transaction categories of a plurality of payment transaction categories; determining, with at least one processor, a highest prediction score of the plurality of prediction scores for the plurality of dominant account profiles, wherein the highest prediction score corresponds to a recommended dominant account profile of the plurality of dominant account profiles for the account; generating, with at least one processor, at least one report associated with the recommended dominant account profile of the plurality of dominant account profiles for the account based on determining the recommended dominant account profile; and communicating, with at least one processor, the at least one report based on generating the at least one report.

According to some non-limiting embodiments, provided is a system for determining a dominant account profile of an account. The system comprises at least one processor programmed or configured to receive transaction data, wherein the transaction data is associated with a plurality of payment transactions conducted within a predetermined time interval of activation of an account involved in the plurality of payment transactions, wherein the plurality of payment transactions involve a user associated with the account; generate a dominant account profile classification model; and determine a plurality of prediction scores for the account based on the dominant account profile classification model and the transaction data, wherein when determining the plurality of prediction scores, the at least one processor is programmed or configured to: determine, for the account of the user, a prediction score for each dominant account profile of a plurality of dominant account profiles, wherein a prediction score for a dominant account profile comprises a prediction of whether the user will conduct a threshold value of payment transactions using the account in one or more payment transaction categories of a plurality of payment transaction categories; determine a highest prediction score of the plurality of prediction scores for the plurality of dominant account profiles, wherein the highest prediction score corresponds to a recommended dominant account profile of the plurality of dominant account profiles for the account; generate at least one report associated with the recommended dominant account profile of the plurality of dominant account profiles for the account based on determining the recommended dominant account profile; and communicate the at least one report based on generating the at least one report.

According to some non-limiting embodiments, provided is a computer program product for determining a dominant account profile of an account. The computer program product comprises at least one non-transitory computer-readable medium including one or more instructions that, when executed by at least one processor, cause the at least one processor to receive first transaction data, wherein the transaction data is associated with a plurality of payment transactions conducted within a predetermined time interval of activation of an account involved in the plurality of payment transactions, wherein the plurality of payment transactions involve a user associated with the account; generate a dominant account profile classification model based on second transaction data; and determine a plurality of prediction scores for the account based on the dominant account profile classification model and the first transaction data, wherein the one or more instructions that, when executed cause the at least one processor to determine the plurality of prediction scores, cause the at least one processor to: determine, for the account of the user, a prediction score for each dominant account profile of a plurality of dominant account profiles, wherein a prediction score for a dominant account profile comprises a prediction of whether the user will conduct a threshold value of payment transactions using the account in one or more payment transaction categories of a plurality of payment transaction categories; determine a highest prediction score of the plurality of prediction scores for the plurality of dominant account profiles, wherein the highest prediction score corresponds to a recommended dominant account profile of the plurality of dominant account profiles for the account; generate at least one offer associated with the recommended dominant account profile of the plurality of dominant account profiles for the account based on determining the recommended dominant account profile; and communicate the at least one offer based on generating the at least one offer.

Further non-limiting embodiments or aspects are set forth in the following numbered clauses:

Clause 1: A method for determining a dominant account profile of an account, the method comprising: receiving, with at least one processor, transaction data, wherein the transaction data is associated with a plurality of payment transactions conducted within a predetermined time interval of activation of an account involved in the plurality of payment transactions, wherein the plurality of payment transactions involve a user associated with the account; generating, with at least one processor, a dominant account profile classification model; and determining, with at least one processor, a plurality of prediction scores for the account based on the dominant account profile classification model and the transaction data, wherein determining the plurality of prediction scores comprises: determining, with at least one processor, for the user, a prediction score for each dominant account profile of a plurality of dominant account profiles, wherein a prediction score for a dominant account profile comprises a prediction of whether the user will conduct a threshold value of payment transactions using the account in one or more payment transaction categories of a plurality of payment transaction categories; determining, with at least one processor, a highest prediction score of the plurality of prediction scores for the plurality of dominant account profiles, wherein the highest prediction score corresponds to a recommended dominant account profile of the plurality of dominant account profiles for the account; generating, with at least one processor, at least one report associated with the recommended dominant account profile of the plurality of dominant account profiles for the account based on determining the recommended dominant account profile; and communicating, with at least one processor, the at least one report based on generating the at least one report.

Clause 2: The method of clause 1, wherein the dominant account profile classification model comprises a multinomial classification model.

Clause 3: The method of clauses 1 or 2, wherein the plurality of dominant account profiles comprises: a first dominant account profile associated with a first payment transaction category, the first payment transaction category comprising a first threshold value of payment transactions conducted during a predetermined time interval using a card-not-present payment channel independent of one or more merchant categories, a second dominant account profile associated with a second payment transaction category, the second payment transaction category comprising a second threshold value of payment transactions conducted during the predetermined time interval in a fuel merchant category, a food and grocery merchant category, a telecommunications and utilities merchant category, a quick service restaurant (QSR) merchant category, and a drug store and pharmacy merchant category, a third dominant account profile associated with a third payment transaction category, the third payment transaction category comprising a third threshold value of payment transactions conducted during the predetermined time interval in a restaurants merchant category, an apparel and accessories merchant category, a discount store merchant category, a department store merchant category, a retail goods merchant category, an entertainment merchant category, and an electronics merchant category, a fourth dominant account profile associated with a fourth payment transaction category, the fourth payment transaction category comprising a fourth threshold value of payment transactions conducted during the predetermined time interval in a transportation merchant category, a lodging merchant category, a travel services merchant category, an airlines merchant category, and a vehicle rental merchant category, and a fifth dominant account profile associated with a fifth payment transaction category, the fifth payment transaction category comprising a fifth threshold value of payment transactions conducted during the predetermined time interval in health care merchant category, an education and government merchant category, a retail services merchant category, an automotive merchant category, a professional services merchant category, a business to business merchant category, a direct marketing merchant category, and a wholesale club merchant category.

Clause 4: The method of any of clauses 1-3, further comprising: determining a set of transaction variables based on the transaction data; and wherein generating the dominant account profile classification model comprises: generating the dominant account profile classification model based on the set of transaction variables.

Clause 5: The method of any of clauses 1-4, wherein the set of transaction variables comprises at least one of the following: an account activation variable associated with whether an account of the user was involved in a payment transaction conducted in a payment transaction category, an account activation variable associated with a number of payment transaction categories in which a payment transaction involving an account of the user was conducted, an account activation variable associated with a number of payment transactions involving an account of the user in a payment transaction category, an account activation variable associated with a transaction volume of a plurality of payment transactions involving an account of the user in a payment transaction category, an account activation variable associated with whether an account of the user was involved in a type of payment transaction, an account activation variable associated with a number of payment transactions involving an account of the user based on a type of payment transaction, an account activation variable associated with a transaction volume of a plurality of payment transactions involving an account of the user based on a type of payment transaction, an account activation variable associated with whether an account of the user was involved in a payment transaction during a time interval, an account activation variable associated with a number of payment transactions involving an account of the user during a time interval, an account activation variable associated with a transaction volume associated with a plurality of payment transactions involving an account of the user during a time interval, an account activation variable associated with whether an account of a plurality of accounts the user was involved in a payment transaction, an account activation variable associated with a number of payment transactions involving an account of a plurality of accounts the user as compared to a number of payment transaction involving the plurality of accounts of the user, an account activation variable associated with a transaction volume of a plurality of payment transactions involving a plurality of accounts the user, or any combination thereof.

Clause 6: The method of any of clauses 1-5, wherein the transaction data is first transaction data associated with a first plurality of payment transactions, and the method further comprising: determining transaction data associated with a second plurality of payment transactions involving a plurality of accounts of a plurality of users; segmenting the second plurality of payment transactions into one or more dominant account profiles of the plurality of dominant account profiles based on the transaction data associated with the second plurality of payment transactions; and identifying a dominant account profile for each account of the plurality of accounts based on segmenting the second plurality of payment transactions into the one or more dominant account profiles of the plurality of dominant account profiles.

Clause 7: The method of any of clauses 1-6, wherein the plurality of payment transactions comprises a plurality of payment transaction conducted using a debit account during the predetermined time interval after activation of the debit account.

Clause 8: The method of any of clauses 1-7, wherein the predetermined time interval after activation of the debit account is 30 days.

Clause 9: A system for determining a dominant account profile of an account, the system comprising: at least one processor programmed or configured to: receive transaction data, wherein the transaction data is associated with a plurality of payment transactions conducted within a predetermined time interval of activation of an account involved in the plurality of payment transactions, wherein the plurality of payment transactions involve a user associated with the account; generate a dominant account profile classification model; and determine a plurality of prediction scores for the account based on the dominant account profile classification model and the transaction data, wherein when determining the plurality of prediction scores, the at least one processor is programmed or configured to: determine, for the account of the user, a prediction score for each dominant account profile of a plurality of dominant account profiles, wherein a prediction score for a dominant account profile comprises a prediction of whether the user will conduct a threshold value of payment transactions using the account in one or more payment transaction categories of a plurality of payment transaction categories; determine a highest prediction score of the plurality of prediction scores for the plurality of dominant account profiles, wherein the highest prediction score corresponds to a recommended dominant account profile of the plurality of dominant account profiles for the account; generate at least one report associated with the recommended dominant account profile of the plurality of dominant account profiles for the account based on determining the recommended dominant account profile; and communicate the at least one report based on generating the at least one report.

Clause 10: The system of clause 9, wherein the plurality of dominant account profiles comprises at least one of the following: a first dominant account profile associated with a first payment transaction category, the first payment transaction category comprising a first threshold value of payment transactions conducted during a predetermined time interval using a card-not-present payment channel independent of one or more merchant categories, a second dominant account profile associated with a second payment transaction category, the second payment transaction category comprising a second threshold value of payment transactions conducted during the predetermined time interval in a fuel merchant category, a food and grocery merchant category, a telecommunications and utilities merchant category, a quick service restaurant (QSR) merchant category, and a drug store and pharmacy merchant category, a third dominant account profile associated with a third payment transaction category, the third payment transaction category comprising a third threshold value of payment transactions conducted during the predetermined time interval in a restaurants merchant category, an apparel and accessories merchant category, a discount store merchant category, a department store merchant category, a retail goods merchant category, an entertainment merchant category, and an electronics merchant category, a fourth dominant account profile associated with a fourth payment transaction category, the fourth payment transaction category comprising a fourth threshold value of payment transactions conducted during the predetermined time interval in a transportation merchant category, a lodging merchant category, a travel services merchant category, an airlines merchant category, and a vehicle rental merchant category, a fifth dominant account profile associated with a fifth payment transaction category, the fifth payment transaction category comprising a fifth threshold value of payment transactions conducted during the predetermined time interval in health care merchant category, an education and government merchant category, a retail services merchant category, an automotive merchant category, a professional services merchant category, a business to business merchant category, a direct marketing merchant category, and a wholesale club merchant category, or any combination thereof.

Clause 11: The system of clauses 9 or 10, wherein the at least one processor is further programmed or configured to: determine a set of transaction variables based on the transaction data; and wherein generating the dominant account profile classification model comprises: generating the dominant account profile classification model based on the set of transaction variables.

Clause 12: The system of any of clauses 9-11, wherein the set of transaction variables comprises at least one of the following: an account activation variable associated with whether an account of the user was involved in a payment transaction conducted in a payment transaction category, an account activation variable associated with a number of payment transaction categories in which a payment transaction involving an account of the user was conducted, an account activation variable associated with a number of payment transactions involving an account of the user in a payment transaction category, an account activation variable associated with a transaction volume of a plurality of payment transactions involving an account of the user in a payment transaction category, an account activation variable associated with whether an account of the user was involved in a type of payment transaction, an account activation variable associated with a number of payment transactions involving an account of the user based on a type of payment transaction, an account activation variable associated with a transaction volume of a plurality of payment transactions involving an account of the user based on a type of payment transaction, an account activation variable associated with whether an account of the user was involved in a payment transaction during a time interval, an account activation variable associated with a number of payment transactions involving an account of the user during a time interval, an account activation variable associated with a transaction volume associated with a plurality of payment transactions involving an account of the user during a time interval, an account activation variable associated with whether an account of a plurality of accounts the user was involved in a payment transaction, an account activation variable associated with a number of payment transactions involving an account of a plurality of accounts the user as compared to a number of payment transaction involving the plurality of accounts of the user, an account activation variable associated with a transaction volume of a plurality of payment transactions involving a plurality of accounts the user, or any combination thereof.

Clause 13: The system of any of clauses 9-12, wherein the transaction data is first transaction data associated with a first plurality of payment transactions, and the at least one processor is further programmed or configured to: determine transaction data associated with a second plurality of payment transactions involving a plurality of accounts of a plurality of users; segment the second plurality of payment transactions into one or more dominant account profiles of the plurality of dominant account profiles based on the transaction data associated with the second plurality of payment transactions; and identify a dominant account profile for each account of the plurality of accounts based on segmenting the second plurality of payment transactions into the one or more dominant account profiles of the plurality of dominant account profiles.

Clause 14: The system of any of clauses 9-13, wherein the plurality of payment transactions comprises a plurality of payment transaction conducted using a debit account during the predetermined time interval after activation of the debit account.

Clause 15: The system of any of clauses 9-14, wherein the predetermined time interval after activation of the debit account is 30 days.

Clause 16: A computer program product for determining a dominant account profile of an account, the computer program product comprising at least one non-transitory computer-readable medium including one or more instructions that, when executed by at least one processor, cause the at least one processor to: receive first transaction data, wherein the transaction data is associated with a plurality of payment transactions conducted within a predetermined time interval of activation of an account involved in the plurality of payment transactions, wherein the plurality of payment transactions involve a user associated with the account; generate a dominant account profile classification model based on second transaction data; and determine a plurality of prediction scores for the account based on the dominant account profile classification model and the first transaction data, wherein the one or more instructions that, when executed cause the at least one processor to determine the plurality of prediction scores, cause the at least one processor to: determine, for the account of the user, a prediction score for each dominant account profile of a plurality of dominant account profiles, wherein a prediction score for a dominant account profile comprises a prediction of whether the user will conduct a threshold value of payment transactions using the account in one or more payment transaction categories of a plurality of payment transaction categories; determine a highest prediction score of the plurality of prediction scores for the plurality of dominant account profiles, wherein the highest prediction score corresponds to a recommended dominant account profile of the plurality of dominant account profiles for the account; generate at least one offer associated with the recommended dominant account profile of the plurality of dominant account profiles for the account based on determining the recommended dominant account profile; and communicate the at least one offer based on generating the at least one offer.

Clause 17: The computer program product of clause 16, wherein the dominant account profile classification model comprises a multinomial classification model.

Clause 18: The computer program product of clauses 16 or 17, wherein the plurality of dominant account profiles comprises at least one of the following: a first dominant account profile associated with a first payment transaction category, the first payment transaction category comprising a first threshold value of payment transactions conducted during a predetermined time interval using a card-not-present payment channel independent of one or more merchant categories, a second dominant account profile associated with a second payment transaction category, the second payment transaction category comprising a second threshold value of payment transactions conducted during the predetermined time interval in a fuel merchant category, a food and grocery merchant category, a telecommunications and utilities merchant category, a quick service restaurant (QSR) merchant category, and a drug store and pharmacy merchant category, a third dominant account profile associated with a third payment transaction category, the third payment transaction category comprising a third threshold value of payment transactions conducted during the predetermined time interval in a restaurants merchant category, an apparel and accessories merchant category, a discount store merchant category, a department store merchant category, a retail goods merchant category, an entertainment merchant category, and an electronics merchant category, a fourth dominant account profile associated with a fourth payment transaction category, the fourth payment transaction category comprising a fourth threshold value of payment transactions conducted during the predetermined time interval in a transportation merchant category, a lodging merchant category, a travel services merchant category, an airlines merchant category, and a vehicle rental merchant category, a fifth dominant account profile associated with a fifth payment transaction category, the fifth payment transaction category comprising a fifth threshold value of payment transactions conducted during the predetermined time interval in health care merchant category, an education and government merchant category, a retail services merchant category, an automotive merchant category, a professional services merchant category, a business to business merchant category, a direct marketing merchant category, and a wholesale club merchant category, or any combination thereof.

Clause 19: The computer program product of any of clauses 16-18, wherein the plurality of payment transactions comprises a plurality of payment transaction conducted using a debit account during the predetermined time interval after activation of the debit account.

Clause 20: The computer program product of any of clauses 16-19, wherein the predetermined time interval after activation of the debit account is 30 days.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
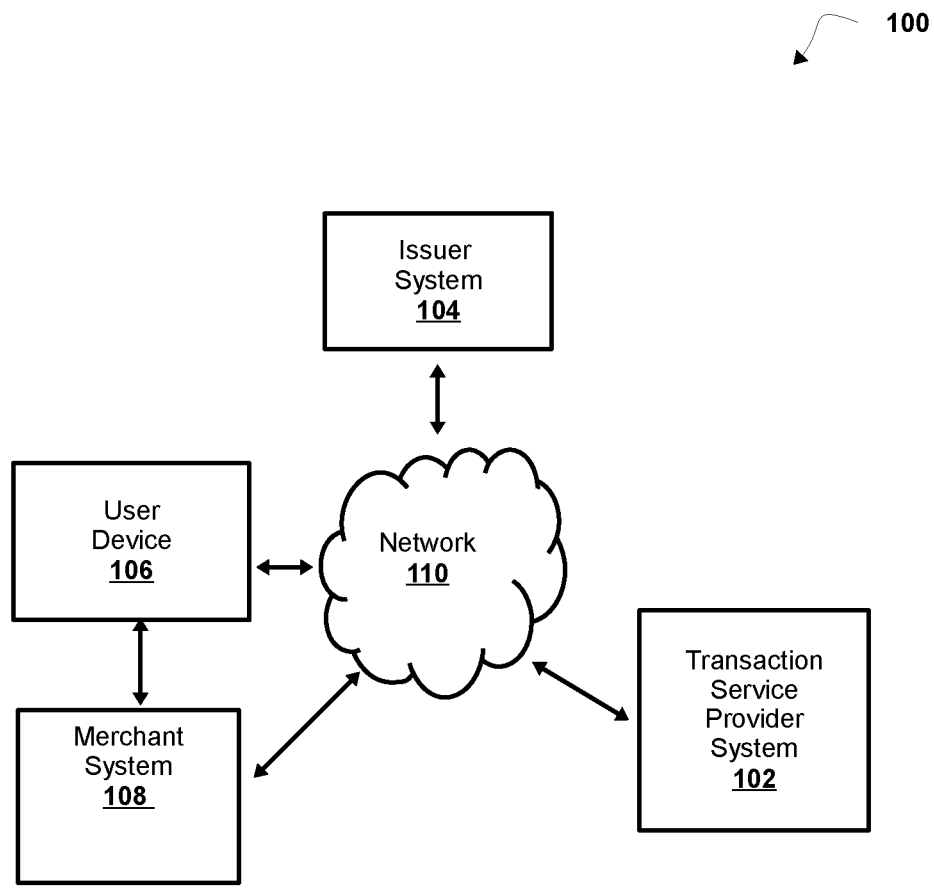
FIG. 1 is a diagram of some non-limiting embodiments of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible. It will be appreciated that numerous other arrangements are possible.

As used herein, the terms "issuer institution," "portable financial device issuer," "issuer," or "issuer bank" may refer to one or more entities that provide one or more accounts to a user (e.g., customer, consumer, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card) and/or may be electronic and used for electronic payments. In some non-limiting embodiments, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "account identifier" may refer to one or more types of identifiers associated with a user account (e.g., an account identifier, a PAN, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token may be used as a substitute or replacement identifier for an original account identifier, such as a PAN. Tokens may be associated with a PAN or other original account identifier in one or more data structures (e.g., one or more databases and/or the like) such that they may be used to conduct a transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the account identifier, such as a PAN.

In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "POS system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network, such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a PDA, a pager, a security card, a computer, an access card, a wireless terminal, and/or a transponder, as examples. The portable financial device may include volatile or non-volatile memory to store information (e.g., an account identifier, a name of the account holder, and/or the like).

As used herein, the terms "client" and "client device" may refer to one or more client-side devices or systems, remote from a transaction service provider, used to initiate or facilitate a transaction. As an example, a "client device" may refer to one or more POS devices and/or POS systems used by a merchant. It will be appreciated that a client device may be any electronic device configured to communicate with one or more networks and initiate or facilitate transactions such as, but not limited to, one or more computers, portable computers, tablet computers, cellular phones, wearable devices (e.g., watches, glasses, lenses, clothing, and/or the like), PDAs, and/or other like devices. Moreover, a "client" may also refer to an entity, such as a merchant, that owns, utilizes, and/or operates a client device for initiating transactions with a transaction service provider.

As used herein, the term "server" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present disclosure are directed to systems, methods, and computer program products for determining a dominant account profile of an account. In some non-limiting embodiments, a method may include receiving transaction data, where the transaction data is associated with a plurality of payment transactions conducted within a predetermined time interval of activation of an account involved in the plurality of payment transactions and the plurality of payment transactions involve a user associated with the account, generating a dominant account profile classification model, and determining a plurality of prediction scores for the account based on the dominant account profile classification model and the transaction data. In some non-limiting embodiments, determining the plurality of prediction scores comprises determining, for the user, a prediction score for each dominant account profile of a plurality of dominant account profiles, where a prediction score for a dominant account profile comprises a prediction of whether the user will conduct a threshold value of payment transactions using the account in one or more payment transaction categories of a plurality of payment transaction categories.

In some non-limiting embodiments, the method may include determining a highest prediction score of the plurality of prediction scores for the plurality of dominant account profiles, where the highest prediction score corresponds to a recommended dominant account profile of the plurality of dominant account profiles for the account, generating at least one report associated with the recommended dominant account profile of the plurality of dominant account profiles for the account based on determining the recommended dominant account profile, and communicating the at least one report based on generating the at least one report.

In this way, non-limiting embodiments of the present disclosure are effective at accurately determining a dominant account profile for an account of a user so that a payment transaction category may be identified, which can be used to determine an offer that is to be communicated to the user that is effective at encouraging the user to conduct a payment transaction in a merchant category associated with the payment transaction category. Accordingly, a transaction service provider, a financial institution, and/or a merchant may cause an offer to be communicated to the user that is effective at encouraging the user to conduct a payment transaction in a merchant category. In this way, non-limiting embodiments of the present disclosure may reduce consumption of network resources and processing resources associated with communicating an offer to the user based on a determination that a user is likely to conduct a payment transaction in a merchant category as compared to communicating an offer to the one or more users independent of the determination.

Referring now to FIG. 1, FIG. 1 is a diagram of an example environment 100 in which devices, systems, and/or methods, described herein, may be implemented. As shown in FIG. 1, environment 100 includes a transaction service provider system 102, an issuer system 104, a user device 106, a merchant system 108, and a network 110. Transaction service provider system 102, issuer system 104, user device 106, and/or merchant system 108 may interconnect (e.g., establish a connection to communicate) via wired connections, wireless connections, or a combination of wired and wireless connections.

Transaction service provider system 102 may include one or more devices capable of receiving information from issuer system 104, user device 106, and/or merchant system 108 via network 110 and/or communicating information to issuer system 104, user device 106, and/or merchant system 108 via network 110. For example, transaction service provider system 102 may include a computing device, such as a server (e.g., a transaction processing server), a group of servers, and/or other like devices. In some non-limiting embodiments, transaction service provider system 102 may be associated with a transaction service provider as described herein. In some non-limiting embodiments, transaction service provider system 102 may be in communication with a data storage device, which may be local or remote to the transaction service provider system 102. In some non-limiting embodiments, transaction service provider system 102 may be capable of receiving information from, storing information in, communicating information to, or searching information stored in a data storage device.

Issuer system 104 may include one or more devices capable of receiving information from transaction service provider system 102 and/or user device 106 via a network (e.g., network 110) and/or communicating information to transaction service provider system 102, user device 106, and/or merchant system 108 via the network. For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with user device 106.

User device 106 may include one or more devices capable of receiving information from and/or communicating information to transaction service provider system 102, issuer system 104, and/or merchant system 108, via network 110. For example, user device 106 may include a client device and/or the like. In some non-limiting embodiments, user device 106 may or may not be capable of receiving information (e.g., from merchant system 108) via a short range wireless communication connection (e.g., an NFC communication connection, an RFID communication connection, a Bluetooth® communication connection, and/or the like) and/or communicating information (e.g., to merchant system 108) via a short range wireless communication connection.

Merchant system 108 may include one or more devices capable of receiving information from transaction service provider system 102, issuer system 104, and/or user device 106 via network 110 and/or communicating information to transaction service provider system 102, issuer system 104, and/or user device 106 via network 110. Merchant system 108 may also include a device capable of receiving information from user device 106 via network 110, a communication connection (e.g., an NFC communication connection, an RFID communication connection, a Bluetooth® communication connection, and/or the like) with user device 106, and/or the like, and/or communicating information to user device 106 via the network, the communication connection, and/or the like. For example, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more user devices 106. For example, merchant system 108 may include user device 106 that allows a merchant to communicate information to transaction service provider system 102. In some non-limiting embodiments, merchant system 108 may include one or more devices, such as computers, computer systems, and/or peripheral devices capable of being used by a merchant to conduct a payment transaction with a user. For example, merchant system 108 may include a POS device and/or a POS system.

Network 110 may include one or more wired and/or wireless networks. For example, network 110 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
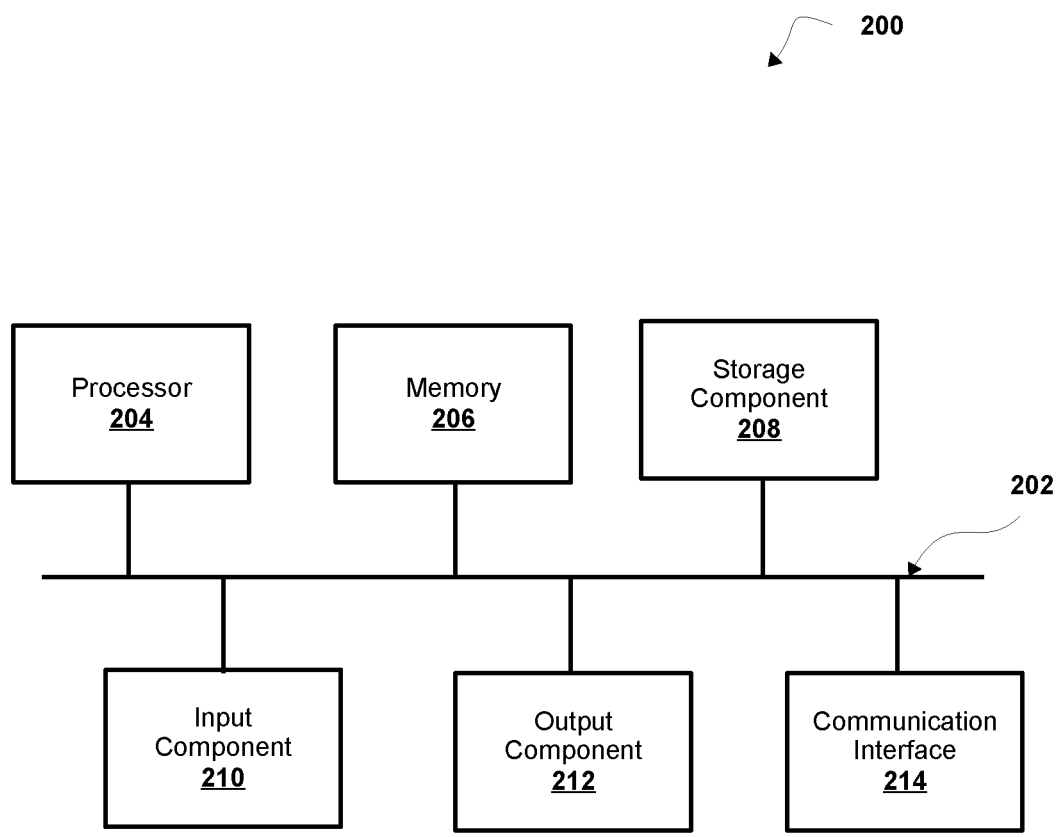
FIG. 2 is a diagram of some non-limiting embodiments of components of one or more devices of FIG. 1.

Referring now to FIG. 2, FIG. 2 is a diagram of example components of a device 200. Device 200 may correspond to transaction service provider system 102, and/or one or more devices of issuer system 104, user device 106, and/or merchant system 108. In some non-limiting embodiments, transaction service provider system 102, issuer system 104, user device 106, and/or merchant system 108 may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
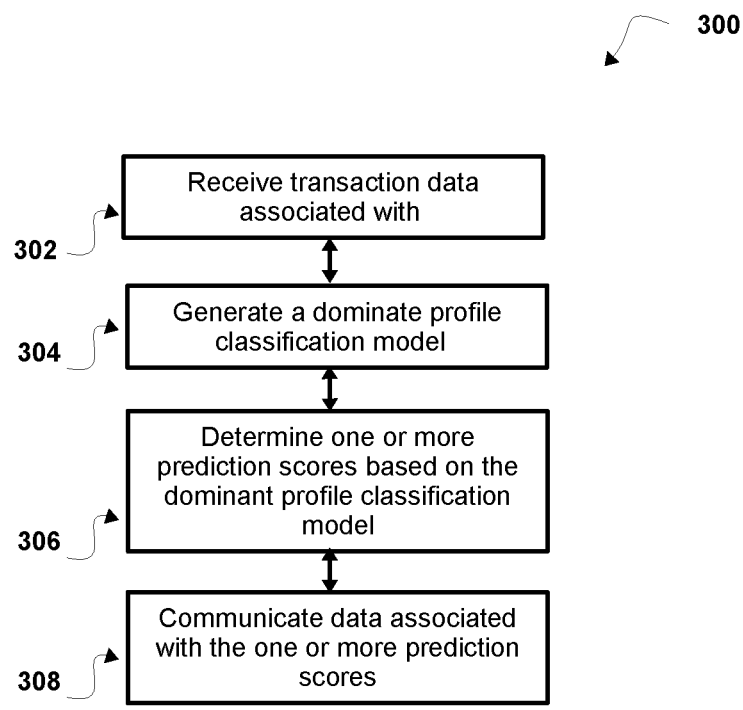
FIG. 3 is a flowchart of some non-limiting embodiments of a process for determining a dominant account profile of an account.

Referring now to FIG. 3, FIG. 3 is a flowchart of some non-limiting embodiments of a process 300 for determining a merchant category alignment of an account. In some non-limiting embodiments, one or more of the steps of process 300 may be performed (e.g., completely, partially, etc.) by transaction service provider system 102 (e.g., one or more devices of transaction service provider system 102). In some non-limiting embodiments, one or more of the steps of process 300 may be performed (e.g., completely, partially, etc.) by another device or a group of devices separate from or including transaction service provider system 102, such as issuer system 104 (e.g., one or more devices of issuer system 104), user device 106, or merchant system 108 (e.g., one or more devices of merchant system 108).

As shown in FIG. 3, at step 302, process 300 includes receiving transaction data associated with a plurality of payment transactions. For example, transaction service provider system 102 may receive transaction data (e.g., historical transaction data, first transaction data, first historical transaction data, and/or the like) associated with a plurality of payment transactions involving (e.g., conducted by) a user, a plurality of users, and/or the like. In some non-limiting embodiments, the transaction data may be associated with a plurality of payment transactions involving one or more accounts (e.g., a credit card account, a debit card account, and/or the like) of a user, a plurality of accounts of a plurality of users, and/or the like.

In some non-limiting embodiments, transaction service provider system 102 may receive transaction data associated with a plurality of payment transactions conducted within a predetermined time interval of (e.g., within a predetermined time interval of 30 days from, and/or the like) activation of an account (e.g., a debit account, a credit account, a debit card account, a credit card account, and/or the like) involved in the plurality of payment transactions. For example, transaction service provider system 102 may receive the transaction data associated with the plurality of payment transactions conducted within the predetermined time interval of activation of the account (e.g., a debit account, a credit account, a debit card account, a credit card account, and/or the like) where the plurality of payment transactions involves a user associated with the account.

In some non-limiting embodiments, transaction service provider system 102 may receive the transaction data from issuer system 104 and/or merchant system 108 (e.g., via network 110). For example, transaction service provider system 102 may receive the transaction data from merchant system 108 via network 110 in real-time while a payment transaction is being conducted, after a payment transaction has been authorized, after a payment transaction has been cleared, and/or after a payment transaction has been settled. In some non-limiting embodiments, historical transaction data may include transaction data associated with one or more payment transactions that have been authorized, cleared, and/or settled.

In some non-limiting embodiments, the transaction data may be associated with a payment transaction (e.g., a payment transaction of a plurality of payment transactions) and/or a plurality of payment transactions. For example, the transaction data may be associated with a payment transaction involving a user and a merchant (e.g., a merchant associated with merchant system 108). In some non-limiting embodiments, the plurality of payment transactions may involve a plurality of users and a plurality of merchants and each payment transaction of the plurality of payment transactions may involve a single user and a single merchant.

In some non-limiting embodiments, the transaction data associated with a payment transaction may include transaction amount data associated with an amount of the payment transaction (e.g., a cost associated with the payment transaction, a transaction amount, an overall transaction amount, a cost of one or more products involved in the payment transaction, and/or the like), transaction time data associated with a time interval at which the payment transaction occurred (e.g., a time of day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like), transaction type data associated with a transaction type of the payment transaction (e.g., an online transaction, a card present transaction, a face-to-face transaction, and/or the like), and/or the like.

Additionally or alternatively, the transaction data may include user transaction data associated with the user involved in the payment transaction, merchant transaction data associated with the merchant involved in the payment transaction, and/or issuer institution transaction data associated with an issuer institution of an account involved in the payment transaction. In some non-limiting embodiments, user transaction data may include user identity data associated with an identity of the user (e.g., a unique identifier of the user, a name of the user, and/or the like), user account data associated with an account of the user (e.g., an account identifier associated with the user, a PAN associated with a credit and/or debit account of the user, a token associated with a credit and/or debit account of the user, and/or the like), and/or the like.

In some non-limiting embodiments, merchant transaction data may include merchant identity data associated with an identity of the merchant (e.g., a unique identifier of the merchant, a name of the merchant, and/or the like), merchant category data associated with at least one merchant category of the merchant (e.g., a code for a merchant category, a name of a merchant category, a type of a merchant category, and/or the like), merchant account data associated with an account of the merchant (e.g., an account identifier associated with an account of the merchant, a PAN associated with an account of the merchant, a token associated with an account of the merchant, and/or the like), and/or the like.

In some non-limiting embodiments, issuer institution transaction data may include issuer institution identity data associated with the issuer institution that issued an account involved in the payment transaction (e.g., a unique identifier of the issuer institution, a name of the issuer institution, an issuer identification number (IIN) associated with the issuer institution, a BIN associated with the issuer institution, and/or the like), and/or the like.

In some non-limiting embodiments, transaction data associated with a payment transaction (e.g., each payment transaction of a plurality of payment transactions) may identify a merchant category of a merchant involved in the payment transaction. For example, transaction data associated with the payment transaction may include merchant transaction data that identifies a merchant category of a merchant involved in the payment transaction. A merchant category may be information that is used to classify the merchant based on the type of goods or services the merchant provides. In some non-limiting embodiments, a payment transaction may involve a merchant that is associated with a merchant category of a plurality of merchant categories.

In some non-limiting embodiments, transaction data associated with a payment transaction may identify a time (e.g., a time of day, a day, a week, a month, a year, a predetermined time interval, and/or the like) at which the payment transaction occurred. For example, the transaction data associated with the payment transaction may include transaction time data that identifies a time interval at which the payment transaction occurred.

In some non-limiting embodiments, transaction service provider system 102 may determine a parameter associated with the transaction data for a user of a plurality of users, each user of a plurality of users, or a group of users of a plurality of users. For example, transaction service provider system 102 may determine a parameter associated with the transaction data for each user of a plurality of users so that transaction service provider system 102 may determine a group of users of the plurality of users based on the parameter. In some non-limiting embodiments, the parameter may be associated with a spending behavior of a user (e.g., a spending behavior associated with an account of a user). For example, the parameter may be associated with an affluence score of a user (e.g., the parameter may be associated with an average transaction amount of a plurality of payment transactions involving a user, a maximum transaction amount of a plurality of payment transactions involving a user, a minimum transaction amount of a plurality of payment transactions involving a user, and/or the like), a location of a user (e.g., the parameter may be associated with a residential location of a user, a geographic location of a user, a merchant location of a merchant involved in a number of payment transactions with a user, a number of payment transactions involving a user and a merchant, where the merchant is a predetermined distance from a residential location of the user, and/or the like), an online engagement (e.g., online savviness) of a user (e.g., the parameter may be associated with a percentage of payment transactions involving a user that are online payment transactions, whether a user account of the user is accessed by the user a threshold number of times using an online access method, and/or the like), a travel behavior of a user (e.g., the parameter associated with foreign and domestic travel conducted by a user), a demographic of a user (e.g., the parameter may be associated with an age group of a user), an account tenure of a user (e.g., a parameter associated with a time interval between an account enrollment date and a date of a payment transaction that is the most recent payment transaction involving a user), a number of active merchant category codes (e.g., a parameter associated with a number of merchant category codes that are active for a user, a number of merchant category codes in which a payment transaction has been conducted involving a user during a time interval, and/or the like), and/or the like.

In some non-limiting embodiments, transaction service provider system 102 may determine a value of the parameter for each user of a plurality of users. For example, transaction service provider system 102 may determine the value of the parameter for each user of a plurality of users based on transaction data associated with a plurality of payment transactions involving accounts of the plurality of users. In another example, the at least one parameter where the value of the parameter includes a distance from a residence (e.g., a house, a living place, and/or the like) of each user of the plurality of users to a location (e.g., a geographic location, a geographic area, a zip code, a predetermined zip code, and/or the like). In some non-limiting embodiments, transaction service provider system 102 may compare the value of the parameter for each user of a plurality of users. For example, transaction service provider system 102 may compare a first value of the parameter for a first user of the plurality of users to a second value of the parameter for a second user of the plurality of users.

In some non-limiting embodiments, transaction service provider system 102 may determine whether the value of the parameter corresponds for each user of a plurality of users. For example, transaction service provider system 102 may determine whether a first value of the parameter for a first user of the plurality of users is the same as a second value of the parameter for a second user of the plurality of users. In some non-limiting embodiments, transaction service provider system 102 may determine whether the value of the parameter corresponds for each user of a plurality of users based on whether a difference between the value of the parameter for a first user of the plurality of users and the value of the parameter for a second user of the plurality of users satisfies a threshold. For example, transaction service provider system 102 may determine whether a difference between a first value of the parameter for a first user of the plurality of users and a second value of the parameter for a second user of the plurality of users satisfies a threshold value of the difference (e.g., a maximum threshold value of the difference, a minimum threshold value of the difference, and/or the like).

In some non-limiting embodiments, transaction service provider system 102 may determine a group for each user of the plurality of users based on the value of the parameter. For example, transaction service provider system 102 may determine a group for a set of users of the plurality of users based on determining that the value of the parameter corresponds for each user of the set of users.

In some non-limiting embodiments, transaction service provider system 102 may segment the plurality of users into one or more groups of users based on a similarity of the parameter between each user of the one or more groups of users. For example, transaction service provider system 102 may determine a value of the parameter for each user of a plurality of users. Transaction service provider system 102 may compare the value of the parameter for each user to the value of the parameter for one or more other users of the plurality of users. Transaction service provider system 102 may determine a similarity of the parameter (e.g., a similarity of the value of the parameter for each user as compared to the value of the parameter for one or more other users of the plurality of users) between each user of the plurality of users based on comparing the value of the parameter. Transaction service provider system 102 may segment the plurality of users in the one or more groups based on determining the similarity of the parameter between each user of the plurality of users. In some non-limiting embodiments, the similarity of the parameter may include a threshold value of a difference of the value of the parameter for a first user and the value of the parameter for a second user.

As further shown in FIG. 3, at step 304, process 300 includes generating a dominate profile classification model. For example, transaction service provider system 102 may generate a dominate profile classification model based on transaction data associated with a plurality of transactions involving one or more users (e.g., a user, a plurality of users, a group of users, and/or the like). In some non-limiting embodiments, the dominant account profile classification model (e.g., a multinomial classification model created by transaction service provider system 102) may be designed to receive, as an input, transaction data associated with one or more users (e.g., transaction data associated with a plurality of payment transactions involving the one or more users), and provide, as an output, a prediction as to whether the one or more users is associated with a dominant account profile of a plurality of dominant account profiles. For example, the dominant account profile classification model may receive the input and may provide the output that includes a prediction as to whether the one or more users will use an account associated with the one or more users to conduct a threshold value of payment transactions (e.g. a threshold number of payment transactions, a threshold percentage of payment transactions, a threshold percentage of all payment transactions conducted using the account, and/or the like) in one or more payment transaction categories of a plurality of payment transaction categories.

In some non-limiting embodiments, the one or more payment transaction categories may include a threshold value of payment transactions (e.g., a threshold number of payment transactions, a threshold percentage of payment transactions, and/or the like) conducted (e.g., conducted during a predetermined time interval) in one or more merchant categories (e.g., one or more merchant categories associated with a MCC). For example, the one or more payment transaction categories may include a threshold percentage of payment transactions conducted during a predetermined time interval in one or more merchant categories, where the threshold percentage of payment transactions includes the number of payment transactions conducted during the predetermined time interval in one or more merchant categories of a plurality of merchant categories as compared to the number of payment transactions conducted during the predetermined time interval in the plurality of merchant categories. In some non-limiting embodiments, the one or more merchant categories may include a merchant category associated with food and grocery (e.g., a food and grocery merchant category), a merchant category associated with a restaurant (e.g., a restaurant merchant category), a merchant category associated with fuel (e.g., a fuel merchant category), a merchant category associated with a quick service restaurant (QSR) (e.g., a QSR merchant category), a merchant category associated with home improvement and supply (e.g., a home improvement and supply merchant category), a merchant category associated with transportation (e.g., a transportation merchant category), a merchant category associated with apparel and accessories (e.g., an apparel and accessories merchant category), a merchant category associated with entertainment (e.g., an entertainment merchant category), a merchant category associated with a discount store (e.g., a discount store merchant category), a merchant category associated with a department store (e.g., a department store merchant category), a merchant category associated with automotive (e.g., an automotive merchant category), a merchant category associated with lodging (e.g., a lodging merchant category), and/or the like.

In some non-limiting embodiments, the one or more payment transaction categories may include a threshold value of a type of payment transaction (e.g., a type of payment transaction conducted during a predetermined time interval, a card-not-present type of payment transaction conducted during a predetermined time interval, a card-present type of payment transaction conducted during a predetermined time interval, and/or the like). For example, the one or more payment transaction categories may include a threshold percentage of a card-not-present type of payment transaction conducted during a predetermined time interval independent of one or more merchant categories, where the threshold percentage of a card-not-present type of payment transaction includes the number of payment transactions associated with the card-not-present type of payment transaction conducted during the predetermined time interval as compared to the number of payment transactions not associated with the card-not-present type of payment transaction conducted during the predetermined time interval without regard for a merchant category in which a payment transaction was conducted.

In some non-limiting embodiments, the plurality of dominant account profiles may include a dominant account profile (e.g., a first dominant account profile) associated with a payment transaction category, where the payment transaction category includes a threshold value of payment transactions (e.g., a first threshold value of payment transactions) conducted during a predetermined time interval involving a card-not-present type of payment transaction. For example, the dominant account profile may be associated with a threshold value of payment transactions conducted during a predetermined time interval involving a card-not-present type of payment transaction independent of one or more merchant categories associated with one or more MCCs. In some non-limiting embodiments, the dominant account profile may be associated with a payment transaction category that includes a threshold value of 80% of payment transactions conducted during a predetermined time interval involving a card-not-present type of payment transaction independent of one or more merchant categories. In this way, when an account satisfies the threshold value, transaction service provider system 102 may accurately determine a dominant account profile for the account of the user. By accurately determining the dominant account profile for the account of the user, transaction service provider system 102 may determine a payment transaction category that can be used to determine an offer that is to be communicated to a user that is effective at encouraging the user to conduct a payment transaction in a merchant category associated with the payment transaction category.

Additionally or alternatively, the plurality of dominant account profiles may include a dominant account profile (e.g., a second dominant account profile) associated with a payment transaction category, where the payment transaction category includes a threshold value of payment transactions (e.g., a second threshold value of payment transactions) conducted during a predetermined time interval (e.g., a predetermined time interval that is the same as a predetermined time interval for another dominant account profile) in a fuel merchant category, a food and grocery merchant category, a telecommunications and utilities merchant category, a QSR merchant category, and a drug store and pharmacy merchant category. In some non-limiting embodiments, the dominant account profile may be associated with a payment transaction category that includes a threshold value of 50% of payment transactions conducted during a predetermined time interval in a fuel merchant category, a food and grocery merchant category, a telecommunications and utilities merchant category, a QSR merchant category, and a drug store and pharmacy merchant category. In this way, when an account satisfies the threshold value, transaction service provider system 102 may accurately determine a dominant account profile for the account of the user. By accurately determining the dominant account profile for the account of the user, transaction service provider system 102 may determine a payment transaction category that can be used to determine an offer that is to be communicated to a user that is effective at encouraging the user to conduct a payment transaction in a merchant category associated with the payment transaction category.

Additionally or alternatively, the plurality of dominant account profiles may include a dominant account profile (e.g., a third dominant account profile) associated with a payment transaction category, where the payment transaction category includes a threshold value of payment transactions (e.g., a third threshold value of payment transactions) conducted during a predetermined time interval in a restaurants merchant category, an apparel and accessories merchant category, a discount store merchant category, a department store merchant category, a retail goods merchant category, an entertainment merchant category, and an electronics merchant category. In some non-limiting embodiments, the dominant account profile may be associated with a payment transaction category that includes a threshold value of 50% of payment transactions conducted during a predetermined time interval in a restaurants merchant category, an apparel and accessories merchant category, a discount store merchant category, a department store merchant category, a retail goods merchant category, an entertainment merchant category, and an electronics merchant category. In this way, when an account satisfies the threshold value, transaction service provider system 102 may accurately determine a dominant account profile for the account of the user. By accurately determining the dominant account profile for the account of the user, transaction service provider system 102 may determine a payment transaction category that can be used to determine an offer that is to be communicated to a user that is effective at encouraging the user to conduct a payment transaction in a merchant category associated with the payment transaction category.

Additionally or alternatively, the plurality of dominant account profiles may include a dominant account profile (e.g., a fourth dominant account profile) associated with a payment transaction category, where the payment transaction category includes a threshold value of payment transactions (e.g., a fourth threshold value of payment transactions) conducted during a predetermined time interval in a transportation merchant category, a lodging merchant category, a travel services merchant category, an airlines merchant category, and a vehicle rental merchant category. In some non-limiting embodiments, the dominant account profile may be associated with a payment transaction category that includes a threshold value of 50% of payment transactions conducted during a predetermined time interval in a transportation merchant category, a lodging merchant category, a travel services merchant category, an airlines merchant category, and a vehicle rental merchant category. In this way, when an account satisfies the threshold value, transaction service provider system 102 may accurately determine a dominant account profile for the account of the user. By accurately determining the dominant account profile for the account of the user, transaction service provider system 102 may determine a payment transaction category that can be used to determine an offer that is to be communicated to a user that is effective at encouraging the user to conduct a payment transaction in a merchant category associated with the payment transaction category.

Additionally or alternatively, the plurality of dominant account profiles may include a dominant account profile (e.g., a fifth dominant account profile) associated with a payment transaction category, where the payment transaction category includes a threshold value of payment transactions (e.g., a fifth threshold value of payment transactions) conducted during a predetermined time interval in a health care merchant category, an education and government merchant category, a retail services merchant category, an automotive merchant category, a professional services merchant category, a business to business merchant category, a direct marketing merchant category, and a wholesale club merchant category. In some non-limiting embodiments, the dominant account profile may be associated with a payment transaction category that includes a threshold value of 50% of payment transactions conducted during a predetermined time interval in a health care merchant category, an education and government merchant category, a retail services merchant category, an automotive merchant category, a professional services merchant category, a business to business merchant category, a direct marketing merchant category, and a wholesale club merchant category. In this way, when an account satisfies the threshold value, transaction service provider system 102 may accurately determine a dominant account profile for the account of the user. By accurately determining the dominant account profile for the account of the user, transaction service provider system 102 may determine a payment transaction category that can be used to determine an offer that is to be communicated to a user that is effective at encouraging the user to conduct a payment transaction in a merchant category associated with the payment transaction category.

In some non-limiting embodiments, the dominant account profile classification model may be designed to receive, as an input, one or more transaction variables, identified as predictor variables and associated with a user (e.g., an account of a user), and provide, as an output, a prediction (e.g., a probability, a binary output, a yes-no output, a score, a prediction score, and/or the like) that the user will conduct a threshold value (e.g. a threshold number, a threshold percentage, and/or the like) of payment transactions in one or more payment transaction categories of a plurality of payment transaction categories.

In some non-limiting embodiments, transaction service provider system 102 may receive the transaction data from issuer system 104, user device 106, and/or merchant system 108. Transaction service provider system 102 may analyze the transaction data to generate the dominant account profile classification model based on receiving the transaction data. In some non-limiting embodiments, transaction service provider system 102 may generate the dominant account profile classification model by generating a rule for the dominant account profile classification model based on the transaction data (e.g., historical transaction data) associated with a plurality of payment transactions. In some non-limiting embodiments, historical transaction data may include transaction data associated with one or more payment transactions that have been authorized, cleared, and/or settled (e.g., one or more payment transactions that have been authorized, cleared, and/or settled prior to generating the dominant account profile classification model).

In some non-limiting embodiments, transaction service provider system 102 may process the transaction data to obtain training data for the dominant account profile classification model. For example, transaction service provider system 102 may process the transaction data to change the transaction data into a format that may be analyzed (e.g., by transaction service provider system 102) to generate a dominant account profile classification model. The transaction data that is changed may be referred to as training data. In some non-limiting embodiments, transaction service provider system 102 may process the transaction data to obtain the training data based on receiving the transaction data. Additionally, or alternatively, transaction service provider system 102 may process the transaction data to obtain the training data based on transaction service provider system 102 receiving an indication that transaction service provider system 102 is to process the transaction data from a user of transaction service provider system 102, such as when transaction service provider system 102 receives an indication to create a dominant account profile classification model for a time interval corresponding to the transaction data.

In some non-limiting embodiments, transaction service provider system 102 may process the transaction data by determining a transaction variable based on the transaction data. A transaction variable may include a metric, associated with a payment transaction, which may be derived based on the transaction data. The transaction variable may be analyzed to generate a dominant account profile classification model. In one example, the transaction variable may include an account activation variable associated with a user (e.g., an account of a user) involved in a payment transaction, such as an account activation variable associated with whether an account of the user was involved in a payment transaction conducted in a payment transaction category (e.g., a payment transaction category associated with an airline merchant category, an automobile merchant category, a business to business merchant category, a department store merchant category, an education and government merchant category, a food and grocery merchant category, a fuel merchant category, a healthcare merchant category, an insurance merchant category, a professional services merchant category, a QSR merchant category, a restaurant merchant category, a retail services merchant category, a telecom and utilities merchant category, an apparel and accessories merchant category, a direct marketing merchant category, a discount stores merchant category, a drug store merchant category, an electronic merchant category, an entertainment merchant category, a home improvement and supply merchant category, a lodging merchant category, a retail goods merchant category, a transportation merchant category, and/or the like), an account activation variable associated with a number of payment transaction categories in which a payment transaction involving an account of the user was conducted, an account activation variable associated with a number of payment transactions involving an account of the user in a payment transaction category, an account activation variable associated with a transaction volume of a plurality of payment transactions (e.g., a sum of transaction amounts for a plurality of payment transactions) involving an account of the user in a payment transaction category, an account activation variable associated with whether an account of the user was involved in a type of payment transaction (e.g., a card present type of payment transaction, a face to face type of payment transaction, a card-not-present type of payment transaction, an other than face to face type transactions, and/or the like), an account activation variable associated with a number of payment transactions involving an account of the user based on a type of payment transaction, an account activation variable associated with a transaction volume of a plurality of payment transactions involving an account of the user based on a type of payment transaction, an account activation variable associated with whether an account of the user was involved in a payment transaction during a time interval (e.g., during a weekday, during a weekend, and/or the like), an account activation variable associated with a number of payment transactions involving an account of the user during a time interval, an account activation variable associated with a transaction volume associated with a plurality of payment transactions involving an account of the user during a time interval, an account activation variable associated with whether an account of a plurality of accounts the user was involved in a payment transaction (e.g., independent of a payment transaction category), an account activation variable associated with a number of payment transactions involving an account of a plurality of accounts the user as compared to a number of payment transactions involving the plurality of accounts of the user (e.g., independent of a payment transaction category), and/or an account activation variable associated with a transaction volume of a plurality of payment transactions involving a plurality of accounts of the user (e.g., independent of a payment transaction category).

In some non-limiting embodiments, transaction service provider system 102 may analyze the training data to generate the dominant account profile classification model. For example, transaction service provider system 102 may use machine learning techniques to analyze the training data to generate the dominant account profile classification model. In some non-limiting embodiments, generating the dominant account profile classification model (e.g., based on training data obtained from historical transaction data) may be referred to as training the dominant account profile classification model. The machine learning techniques may include, for example, supervised and/or unsupervised techniques, such as decision trees, gradient boosting, logistic regressions, artificial neural networks, Bayesian statistics, learning automata, Hidden Markov Modeling, linear classifiers, quadratic classifiers, association rule learning, or the like. In some non-limiting embodiments, the dominant account profile classification model may include a model that is specific to a particular group of users, a particular group of merchants, a particular group of merchants in a predetermined geographical area, and/or the like. Additionally, or alternatively, the dominant account profile classification model may be specific to a particular issuer institution. In some non-limiting embodiments, transaction service provider system 102 may generate one or more dominant account profile classification models for one or more issuer institutions, a particular group of merchants, and/or a particular group of users.

Additionally, or alternatively, when analyzing the training data, transaction service provider system 102 may identify one or more transaction variables (e.g., one or more independent variables) as predictor variables that may be used to make a prediction (e.g., when analyzing the training data). In some non-limiting embodiments, values of the predictor variables may be inputs to the dominant account profile classification model. For example, transaction service provider system 102 may identify a subset (e.g., a proper subset) of the transaction variables as predictor variables that may be used to accurately predict whether a user will conduct a threshold value of payment transactions using the account in one or more payment transaction categories of a plurality of payment transaction categories. In some non-limiting embodiments, the predictor variables may include one or more of the transaction variables, as discussed above, that have a significant impact (e.g., an impact satisfying a threshold) on a probability that the user will conduct a threshold value of payment transactions using the account in one or more payment transaction categories of a plurality of payment transaction categories as determined by transaction service provider system 102.

In some non-limiting embodiments, transaction service provider system 102 may validate the dominant account profile classification model. For example, transaction service provider system 102 may validate the dominant account profile classification model after transaction service provider system 102 generates the dominant account profile classification model. In some non-limiting embodiments, transaction service provider system 102 may validate the dominant account profile classification model based on a portion of the training data to be used for validation. For example, transaction service provider system 102 may partition the training data into a first portion and a second portion, where the first portion may be used to generate the dominant account profile classification model, as described above. In this example, the second portion of the training data (e.g., the validation data) may be used to validate the dominant account profile classification model.

In some non-limiting embodiments, transaction service provider system 102 may validate the dominant account profile classification model by providing validation data associated with a user (e.g., transaction data associated with one or more payment transactions involving a user) as input to the dominant account profile classification model, and determining, based on an output of the dominant account profile classification model, whether the dominant account profile classification model correctly, or incorrectly, predicted that the user will conduct a threshold value of payment transactions using the account in one or more payment transaction categories of a plurality of payment transaction categories. In some non-limiting embodiments, transaction service provider system 102 may validate the dominant account profile classification model based on a validation threshold. For example, transaction service provider system 102 may be configured to validate the dominant account profile classification model when a threshold value (e.g., the validation threshold) of payment transactions that are conducted by the user using the account of the user in one or more payment transaction categories of a plurality of payment transaction categories are correctly predicted by the dominant account profile classification model (e.g., when the dominant account profile classification model correctly predicts 50% of the payment transactions as being conducted in a payment transaction category, 70% of the payment transactions as being conducted in a payment transaction category, a threshold number of the payment transactions being conducted in a payment transaction category, and/or the like).

In some non-limiting embodiments, if transaction service provider system 102 does not validate the dominant account profile classification model (e.g., when a percentage of correctly predicted payment transactions does not satisfy the validation threshold), then transaction service provider system 102 may generate additional dominant account profile classification models.

In some non-limiting embodiments, once the dominant account profile classification model has been validated, transaction service provider system 102 may further train the dominant account profile classification model and/or create new dominant account profile classification models based on receiving new training data. The new training data may include additional transaction data associated with one or more payment transactions. In some non-limiting embodiments, the new training data may include transaction data relating to a prediction that a user will conduct a threshold value of payment transactions using an account in one or more payment transaction categories of a plurality of payment transaction categories. For example, transaction service provider system 102 may use the dominant account profile classification model to predict that a user will conduct a payment transaction using an account in one or more payment transaction categories of a plurality of payment transaction categories. In such an example, transaction service provider system 102 may have communicated an offer to the user based on the prediction, and despite communicating the offer to the user, the user did not conduct a payment transaction using an account in one or more payment transaction categories of a plurality of payment transaction categories (e.g., within a predetermined amount of time of transaction service provider system 102 communicating the offer to the user). In such an example, transaction service provider system 102 may update one or more dominant account profile classification models based on this new training data.

In some non-limiting embodiments, transaction service provider system 102 may store the dominant account profile classification model. For example, transaction service provider system 102 may store the dominant account profile classification model in a data structure (e.g., a database, a linked list, a tree, and/or the like). The data structure may be located within transaction service provider system 102 or external, and possibly remote from, transaction service provider system 102.

As further shown in FIG. 3, at step 306, process 300 includes determining one or more prediction scores based on the dominant account profile classification model. For example, transaction service provider system 102 may determine a plurality of prediction scores based on the dominant account profile classification model and transaction data associated with one or more payment transactions (e.g., historical transaction data, transaction data associated with a plurality of transactions that is different from transaction data associated with a plurality of transactions used to generate a dominant account profile classification model, and/or the like). In some non-limiting embodiments, the transaction data used to determine the plurality of prediction scores may be the same or similar to the transaction data to generate the dominant account profile classification model. In some non-limiting embodiments, the transaction data used to determine the plurality of predictions scores may be associated with a plurality of payment transactions in a plurality of merchant categories conducted during a time interval that is the same as or different from (e.g., before or after) the time interval in which the plurality of payment transactions, which are associated with the transaction data used to generate the dominant account profile classification model, was conducted. In some non-limiting embodiments, transaction service provider system 102 may determine a number of prediction scores that is less than, equal to, or more than a number of users of a plurality of users multiplied by a number of dominant account profiles of a plurality of dominant account profiles.

In some non-limiting embodiments, transaction service provider system 102 may receive transaction data that is used to determine the one or more prediction scores. For example, transaction service provider system 102 may receive transaction data that is associated with a plurality of payment transactions conducted within a predetermined time interval of activation (e.g., within a predetermined time interval of 30 days of activation) of an account (e.g., a debit account, a credit account, and/or the like) involved in a plurality of payment transactions, where the plurality of payment transactions involves a user associated with the account. In some non-limiting embodiments, transaction service provider system 102 may receive (e.g., after receiving the transaction data used to generate the categorical transaction model) the transaction data used to determine the one or more prediction scores from issuer system 104, user device 106, and/or merchant system 108. In some non-limiting embodiments, the transaction data used to determine the plurality of prediction scores may include transaction data associated with one or more payment transactions that have been authorized, cleared, and/or settled.

In some non-limiting embodiments, transaction service provider system 102 may determine for one or more users of the plurality of users, a prediction score in one or more dominant account profiles of a plurality of dominant account profiles. The one or more users may be associated with a prediction score in one or more dominant account profiles of a plurality of dominant account profiles. A prediction score (e.g., each prediction score of the plurality of prediction scores) may include a prediction of whether a user will conduct a threshold value of payment transactions using an account of the user in one or more payment transaction categories of a plurality of payment transaction categories.

In some non-limiting embodiments, transaction service provider system 102 may determine, based on the prediction scores for one or more users of the plurality of users, a recommended dominant account profile for the one or more users. For example, transaction service provider system 102 may determine a dominant account profile of a plurality of dominant account profiles having a highest prediction score out of all prediction scores for each of the dominant account profiles of the plurality of dominant account profiles. Transaction service provider system 102 may determine that the dominant account profile having the highest prediction score is the recommended dominant account profile for the one or more users.

In some non-limiting embodiments, transaction service provider system 102 may determine, based on the prediction scores for a user, at least one additional recommended dominant account profile (e.g., a second recommended dominant account profile, a third recommended dominant account profile, and/or the like) for one or more users of a plurality of users. For example, transaction service provider system 102 may determine a dominant account profile of the plurality of dominant account profiles having the next highest prediction score, as compared to the dominant account profile having the highest prediction score, for one or more users of the plurality of users. Transaction service provider system 102 may determine that the dominant account profile having the next highest prediction score is the additional recommended dominant account profile for the one or more users. In some non-limiting embodiments, a user may be associated with a recommended dominant account profile and at least one additional recommended dominant account profile.

In some non-limiting embodiments, transaction service provider system 102 may determine for a user (e.g., one or more users of the plurality of users) a prediction score in each dominant account profile of five dominant account profiles. For example, each dominant account profile of the five dominant account profiles may include a threshold value of payment transactions to be conducted by the user using an account of the user in one or more payment transaction categories of a plurality of payment transaction categories. Transaction service provider system 102 may determine the prediction score that a user will conduct a threshold value of payment transactions using an account of the user in each payment transaction category of five payment transaction categories. In such an example, transaction service provider system 102 may determine, based on the prediction score, a recommended dominant account profile. In such an example, a first dominant profile may be associated with a first payment transaction category, where the first payment transaction category includes a first threshold value of payment transactions conducted during a predetermined time interval involving a card-not-present type of payment transaction independent of one or more merchant categories, a second dominant profile may be associated with a second payment transaction category, where the second payment transaction category includes a second threshold value of payment transactions conducted during the predetermined time interval in a fuel merchant category, a food and grocery merchant category, a telecommunications and utilities merchant category, a QSR merchant category, and a drug store and pharmacy merchant category, a third dominant profile may be associated with a third payment transaction category, where the third payment transaction category includes a third threshold value of payment transactions conducted during the predetermined time interval in a restaurants merchant category, an apparel and accessories merchant category, a discount store merchant category, a department store merchant category, a retail goods merchant category, an entertainment merchant category, and an electronics merchant category, a fourth dominant profile may be associated with a fourth payment transaction category, where the fourth payment transaction category includes a fourth threshold value of payment transactions conducted during the predetermined time interval in a transportation merchant category, a lodging merchant category, a travel services merchant category, an airlines merchant category, and a vehicle rental merchant category, and a fifth dominant profile may be associated with a fifth payment transaction category, where the fifth payment transaction category includes a fifth threshold value of payment transactions conducted during the predetermined time interval in health care merchant category, an education and government merchant category, a retail services merchant category, an automotive merchant category, a professional services merchant category, a business to business merchant category, a direct marketing merchant category, and a wholesale club merchant category.

In some non-limiting embodiments, transaction service provider system 102 may determine transaction data associated with a plurality of payment transactions involving a plurality of accounts of a plurality of users. Transaction service provider system 102 may segment the plurality of payment transactions into one or more dominant account profiles of a plurality of dominant account profiles based on the transaction data associated with the plurality of payment transactions. Additionally or alternatively, transaction service provider system 102 may identify a dominant account profile for each account of the plurality of accounts based on segmenting the plurality of payment transactions into the one or more dominant account profiles of the plurality of dominant account profiles.

As further shown in FIG. 3, at step 308, process 300 includes communicating data associated with one or more prediction scores. For example, transaction service provider system 102 may communicate data associated with one or more prediction scores to issuer system 104, user device 106, and/or merchant system 108 based on determining the one or more prediction scores. In some non-limiting embodiments, transaction service provider system 102, issuer system 104, and/or merchant system 108 may communicate an offer to user device 106 (e.g., the user associated with user device 106) based on the one or more prediction scores. In some non-limiting embodiments, transaction service provider system 102, issuer system 104, and/or merchant system 108 may communicate an offer to user device 106 based on transaction service provider system 102, issuer system 104, and/or merchant system 108 generating the offer. For example, transaction service provider system 102 may communicate an offer to merchant system 108 and merchant system 108 may communicate the offer to user device 106 based on receiving the offer from transaction service provider system 102.

In some non-limiting embodiments, transaction service provider system 102 may determine a location (e.g., a current location, a home address, a zip code, a geographical area, and/or the like) of user device 106 (e.g., the user associated with user device 106). For example, transaction service provider system 102 may determine location data associated with the location of the user associated with user device 106 based on an online search, based on location data received from an application (e.g., a mobile application stored on user device 106, and/or the like), based on transaction data associated with one or more payment transactions involving the user, and/or the like. Transaction service provider system 102 may determine the location of the user based on the location data. In some non-limiting embodiments, transaction service provider system 102 may determine merchant identity data based on the location of the user. For example, transaction service provider system 102 may determine merchant identity data associated with one or more merchants that are located with a predetermined distance of the location of the user. In some non-limiting embodiments, transaction service provider system 102, issuer system 104, and/or merchant system 108 may communicate an offer to the user based on the merchant identity data and/or a dominant account profile associated with an account of the user. For example, transaction service provider system 102, issuer system 104, and/or merchant system 108 may communicate an offer to the user based on the merchant identity data, where the offer includes an offer associated with the one or more merchants that are located within the predetermined distance of the location of the user. In some non-limiting embodiments, transaction service provider system 102 may communicate a report to issuer system 104 and/or merchant system 108 based on the merchant identity data and/or a dominant account profile associated with an account of the user.

In some non-limiting embodiments, transaction service provider system 102 may generate an offer to be communicated to user device 106 (e.g., a user associated with user device 106) and/or a report to be communicated to issuer system 104 (e.g., an issuer institution associated with issuer system 104) and/or merchant system 108 (e.g., a merchant associated with merchant system 108). For example, transaction service provider system 102 may generate an offer to be communicated to a user (e.g., a user of the plurality of users for which a prediction score was generated) via user device 106 or a plurality of offers to be communicated to the user via user device 106. In another example, transaction service provider system 102 may generate a report to be communicated to issuer system 104 and/or merchant system 108 or a plurality of reports to be communicated to issuer system 104 and/or merchant system 108. In some non-limiting embodiments, transaction service provider system 102 may determine a dominant account profile associated with an offer and/or a report. For example, transaction service provider system 102 may determine, for a user (e.g., an account of a user), a recommended dominant account profile based on the highest prediction score in each dominant account profile of the plurality of dominant account profiles. Transaction service provider system 102 may generate an offer where the offer includes an offer for a merchant category of a payment transaction category associated with the recommended dominant account profile. In such an example, transaction service provider system 102 may generate a number of offers equal to the number of merchant categories of a payment transaction category associated with the recommended dominant account profile.

In some non-limiting embodiments, the offer may include a discount (e.g., a coupon, a monetary discount, and/or the like) to be applied to a payment transaction, a rewards parameter associated with a rewards program (e.g., a rewards program associated with an issuer institution, a rewards program associated with a merchant category that corresponds to the merchant category of the offer, a loyalty program associated with an issuer institution, a loyalty program associated with a merchant, and/or the like), a redemption offer associated with a merchant with a merchant category that corresponds to the merchant category of the offer (e.g., an offer associated with a user receiving a good or a service from the merchant when the user conducts a payment transaction involving the merchant), a repayment plan associated with a payment transaction, and/or the like. In some non-limiting embodiments, the report may include one or more merchant categories of a payment transaction category associated with a dominant account profile.

In some non-limiting embodiments, transaction service provider system 102 may generate an offer and/or a report associated with one or more dominant account profiles based on determining whether one or more prediction scores for the one or more dominant account profiles satisfy a threshold value (e.g., a threshold prediction score). For example, transaction service provider system 102 may generate an offer and/or a report based on determining that the prediction score of one or more dominant account profiles for the account of the user satisfies a threshold prediction score (e.g., a highest prediction score of the one or more dominant account profiles) for the account of the user. In such an example, transaction service provider system 102 may generate an offer and/or a report corresponding to the one or more dominant account profiles determined to be associated with the prediction score that satisfies the threshold prediction score.

Figure 4A:
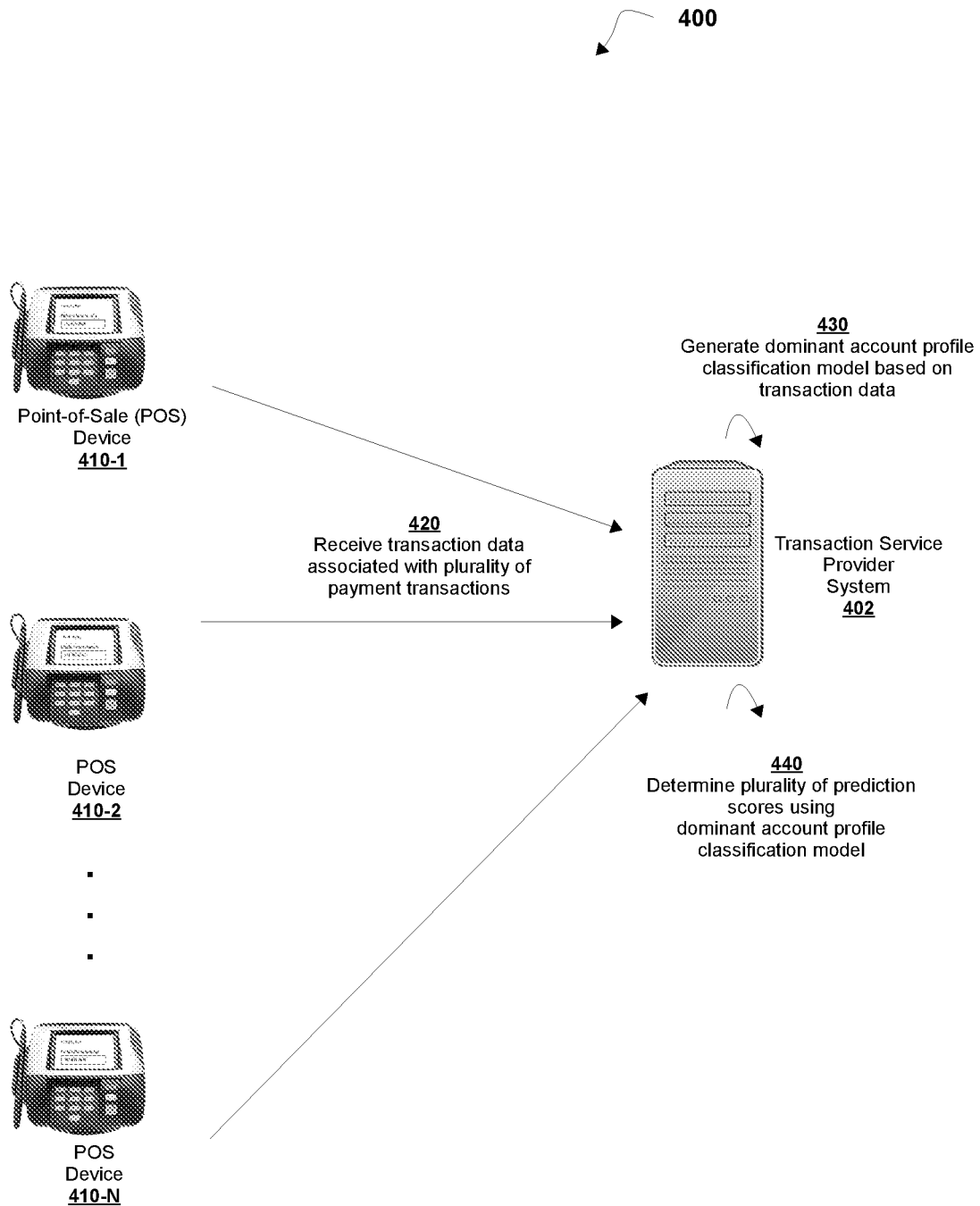
FIGS. 4A-4B are diagrams of an implementation of some non-limiting embodiments of the process shown in FIG. 3.
Figure 4B:
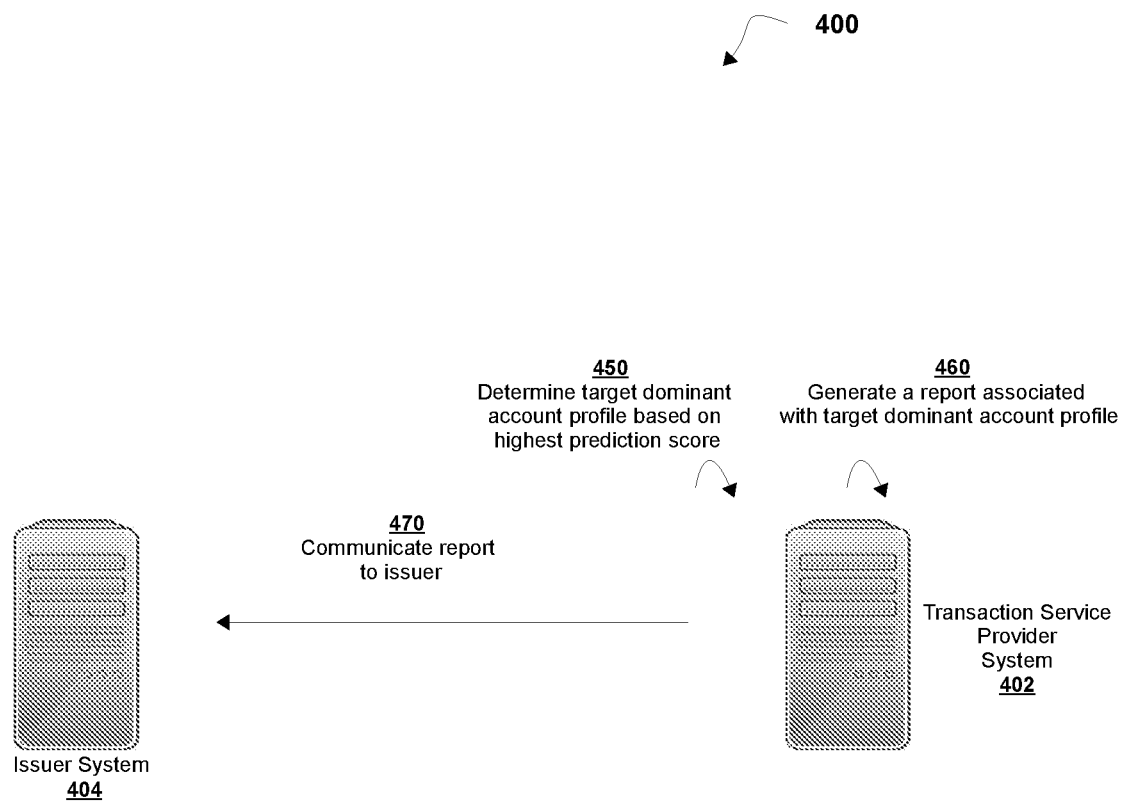

FIGS. 4A and 4B are diagrams of an overview of some non-limiting embodiments of implementation 400 relating to process 300 shown in FIG. 3. As shown in FIGS. 4A and 4B, implementation 400 may include a transaction service provider system 402, an issuer system 404, and one or more POS devices 410-1 through 410-N. As referred to herein, one or more of POS devices 410-1 through 410-N may perform the same or similar functions as a POS device described above. Accordingly, POS devices 410-1 through 410-N may be collectively referred to as "POS devices 410." In some non-limiting embodiments, POS devices 410 may be associated with (e.g., components of) one or more merchant systems 108. In some non-limiting embodiments, transaction service provider system 402 may be the same or similar to transaction service provider system 102, and issuer system 404 may be the same as or similar to issuer system 104 as described above.

As shown by reference number 420 in FIG. 4A, transaction service provider system 402 may receive transaction data from POS devices 410, where the transaction data (e.g., transaction data as described above) may be associated with a plurality of payment transactions conducted within a predetermined time interval of activation of an account involved in the plurality of payment transactions. The plurality of payment transactions may involve a user associated with the account. As further shown by reference number 430 in FIG. 4A, transaction service provider system 402 may generate a dominant account profile classification model based on the transaction data. For example, transaction service provider system 402 may generate the dominant account profile classification model as described above with regard to FIG. 3. As further shown by reference number 440 in FIG. 4A, transaction service provider system 402 may determine a plurality of prediction scores for the account of the user using the dominant account profile classification model. In some non-limiting embodiments, transaction service provider system 402 may determine the plurality of predictions scores for each of a plurality of dominant account profiles based on the dominant account profile classification model and the transaction data. For example, transaction service provider system 402 may determine the plurality of prediction scores as described above with regard to FIG. 3 and the prediction score for a dominant profile may include a prediction of whether the user will conduct a threshold value of payment transactions using the account in one or more payment transaction categories of a plurality of payment transaction categories.

As shown by reference number 450 in FIG. 4B, transaction service provider system 402 may determine a highest prediction score of the plurality of prediction scores for the plurality of dominant account profiles. In some non-limiting embodiments, the highest prediction score may correspond to a recommended dominant account profile of the plurality of dominant account profiles for the account of the user. As further shown by reference number 460 in FIG. 4B, transaction service provider system 402 may generate at least one report associated with the recommended dominant account profile of the plurality of dominant account profiles for the account based on determining the recommended dominant account profile. As further shown by reference number 470 in FIG. 4B, transaction service provider system 402 may communicate the at least one report to issuer system 404 based on generating the at least one report.

Although the disclosure are has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for determining and validating a dominant account profile classification model by matching first and second training data, the method comprising:
   conducting, at a plurality of points of sale, transaction data without initially using any dominant account profile, by associating account identifiers with tokens stored in one or more data structures;
   receiving, with at least one processor, the transaction data;
   associating, with the at least one processor, the transaction data with a plurality of payment transactions conducted by a user within a predetermined time interval after activation of a debit account involved in the plurality of payment transactions;
   generating, with the at least one processor, a dominant account profile classification model, wherein the dominant account profile classification model is configured to provide an output that includes a prediction as to whether the user will use a particular account associated with the user to conduct a threshold value of payment transactions in one or more payment transaction categories of a plurality of payment transaction categories during the predetermined time interval, wherein generating the dominant account profile classification model comprises:
   processing the transaction data to obtain training data for the dominant account profile classification model, wherein processing the transaction data comprises:
   determining a set of transaction variables based on the transaction data, wherein the set of transaction variables comprises at least one of:
   a first account activation variable associated with whether a first account of the user was involved in a first payment transaction conducted in a first payment transaction category,
   a second account activation variable associated with a specific number of the plurality of payment transaction categories in which a second payment transaction involving a second account of the user was conducted,
   a third account activation variable associated with a first number of payment transactions involving a third account of the user in a second payment transaction category,
   a fourth account activation variable associated with a first transaction volume of the plurality of payment transactions involving a fourth account of the user in a third payment transaction category,
   a fifth account activation variable associated with a determination of whether a fifth account of the user was involved in a first type of payment transaction,
   a sixth account activation variable associated with a second number of payment transactions involving a sixth account of the user based on a second type of payment transaction,
   a seventh account activation variable associated with a second transaction volume of the plurality of payment transactions involving a seventh account of the user based on a third type of payment transaction,
   an eighth account activation variable associated with a determination of whether an eighth account of the user was involved in a particular payment transaction during a first time interval, the eighth account activation variable associated with a third number of payment transactions involving the eighth account of the user during the first time interval,
   a ninth account activation variable associated with a third transaction volume associated with the plurality of payment transactions involving a ninth account of the user during a second time interval,
   a tenth account activation variable associated with a determination of whether a tenth account of a plurality of accounts of the user was involved in a specific payment transaction,
   an eleventh account activation variable associated with a fourth number of payment transactions involving an eleventh account of the plurality of accounts of the user as compared to a fifth number of payment transactions involving the plurality of accounts of the user,
   a twelfth account activation variable associated with a fourth transaction volume of the plurality of payment transactions involving the plurality of accounts the of user, or any combination thereof;

storing the dominant account profile classification model in the one or more data structures;

identifying a subset of the set of the transaction variables for determining a probability that the user will conduct the threshold value of the payment transactions; and changing the transaction data into a format to be analyzed to generate the dominant account profile classification model, wherein the training data is partitioned into a first portion and a second portion;

generating a first output from the dominant account profile classification model based on the subset of the set of transaction variables and the first portion of the training data;

generating a second output from the dominant account profile classification model based on the subset of the set of transaction variables and the second portion of the training data; and validating the dominant account profile classification model by matching the first output and the second output from the dominant account profile classification model;

determining, with the at least one processor, a plurality of prediction scores for the particular account based on the dominant account profile classification model and the transaction data, wherein determining the plurality of prediction scores comprises:

determining, with the at least one processor, for the user, a prediction score for each dominant account profile of a plurality of dominant account profiles, wherein the prediction score for a dominant account profile comprises a prediction of whether the user will conduct the threshold value of payment transactions using the particular account in the one or more payment transaction categories of the plurality of payment transaction categories; and determining, with the at least one processor, a highest prediction score of the plurality of prediction scores for the plurality of dominant account profiles, wherein the highest prediction score corresponds to a recommended dominant account profile of the plurality of dominant account profiles for the particular account;

generating, with the at least one processor, at least one report associated with the recommended dominant account profile of the plurality of dominant account profiles for the particular account based on determining the recommended dominant account profile;

communicating, with the at least one processor, the at least one report based on generating the at least one report;

determining, with the at least one processor, a location of the user based on: location data received from a GPS equipped user device, an online search of the user at the user device, and the transaction data associated with the plurality of payment transactions involving the user;

determining, with the at least one processor, merchant identity data associated with a merchant located within a predetermined distance from the determined location of the user;

generating, with the at least one processor, an offer of the merchant based on determining that the prediction score of the recommended dominant account profile satisfies a threshold value of the prediction score;

transmitting, with the at least one processor, the offer to the user based on the determined merchant identity and the recommended dominant account profile;

generating, with the at least one processor, a new training data based on whether the user conducted the payment transaction using the particular account associated with the user based on the offer within the predetermined time interval; and updating, with the at least one processor, the dominant account profile classification model based on the new training data.

2. The method of claim 1, wherein the dominant account profile classification model comprises a multinomial classification model.

3. The method of claim 1, wherein the plurality of dominant account profiles comprises:

a first dominant account profile associated with the first payment transaction category, the first payment transaction category comprising a first threshold value of payment transactions conducted during the predetermined time interval using a card-not-present payment channel independent of one or more merchant categories, a second dominant account profile associated with the second payment transaction category, the second payment transaction category comprising a second threshold value of payment transactions conducted during the predetermined time interval in a fuel merchant category, a food and grocery merchant category, a telecommunications and utilities merchant category, a quick service restaurant (QSR) merchant category, and a drug store and pharmacy merchant category, a third dominant account profile associated with the third payment transaction category, the third payment transaction category comprising a third threshold value of payment transactions conducted during the predetermined time interval in a restaurants merchant category, an apparel and accessories merchant category, a discount store merchant category, a department store merchant category, a retail goods merchant category, an entertainment merchant category, and an electronics merchant category, a fourth dominant account profile associated with a fourth payment transaction category, the fourth payment transaction category comprising a fourth threshold value of payment transactions conducted during the predetermined time interval in a transportation merchant category, a lodging merchant category, a travel services merchant category, an airlines merchant category, and a vehicle rental merchant category, and a fifth dominant account profile associated with a fifth payment transaction category, the fifth payment transaction category comprising a fifth threshold value of payment transactions conducted during the predetermined time interval in a health care merchant category, an education and government merchant category, a retail services merchant category, an automotive merchant category, a professional services merchant category, a business to business merchant category, a direct marketing merchant category, and a wholesale club merchant category.

4. The method of claim 1, wherein the transaction data is first transaction data associated with a first plurality of payment transactions, and the method further comprising:

determining second transaction data associated with a second plurality of payment transactions involving the plurality of accounts of a plurality of users;

segmenting the second plurality of payment transactions into one or more dominant account profiles of the plurality of dominant account profiles based on the transaction data associated with the second plurality of payment transactions; and identifying a dominant account profile for each account of the plurality of accounts based on segmenting the second plurality of payment transactions into the one or more dominant account profiles of the plurality of dominant account profiles.

5. The method of claim 1, wherein the predetermined time interval after activation of the debit account is 30 days.

6. A system for determining and validating a dominant account profile classification model by matching first and second training data, the system comprising at least one processor configured for:

conducting, at a plurality of points of sale, transaction data without initially using any dominant account profile by associating account identifiers with tokens stored in one or more data structures;

receiving the transaction data;

associating the transaction data with a plurality of payment transactions conducted by a user within a predetermined time interval after activation of a debit account involved in the plurality of payment transactions;

generating a dominant account profile classification model, wherein the dominant account profile classification model is configured to provide an output that includes a prediction as to whether the user will use a particular account associated with the user to conduct a threshold value of payment transactions in one or more payment transaction categories of a plurality of payment transaction categories during the predetermined time interval, and wherein generating the dominant account profile classification model comprises:

processing the transaction data to obtain training data for the dominant account profile classification model, wherein processing the transaction data comprises:

determining a set of transaction variables based on the transaction data, wherein the set of transaction variables comprises at least one of:

a first account activation variable associated with whether a first account of the user was involved in a first payment transaction conducted in a first payment transaction category, a second account activation variable associated with a specific number of the plurality of payment transaction categories in which a second payment transaction involving a second account of the user was conducted, a third account activation variable associated with a first number of payment transactions involving a third account of the user in a second payment transaction category, a fourth account activation variable associated with a first transaction volume of the plurality of payment transactions involving a fourth account of the user in a third payment transaction category, a fifth account activation variable associated with a determination of whether a fifth account of the user was involved in a first type of payment transaction, a sixth account activation variable associated with a second number of payment transactions involving a sixth account of the user based on a second type of payment transaction, a seventh account activation variable associated with a second transaction volume of the plurality of payment transactions involving a seventh account of the user based on a third type of payment transaction, an eighth account activation variable associated with a determination of whether an eighth account of the user was involved in a particular payment transaction during a first time interval, the eighth account activation variable associated with a third number of payment transactions involving the eighth account of the user during the first time interval, a ninth account activation variable associated with a third transaction volume associated with the plurality of payment transactions involving a ninth account of the user during a second time interval, a tenth account activation variable associated with a determination of whether a tenth account of a plurality of accounts of the user was involved in a specific payment transaction, an eleventh account activation variable associated with a fourth number of payment transactions involving an eleventh account of the plurality of accounts of the user as compared to a fifth number of payment transactions involving the plurality of accounts of the user, a twelfth account activation variable associated with a fourth transaction volume of the plurality of payment transactions involving the plurality of accounts of the user, or any combination thereof;

storing the dominant account profile classification model in the one or more data structures;

identifying a subset of the set of the transaction variables for determining a probability that the user will conduct the threshold value of the payment transactions; and changing the transaction data into a format to be analyzed to generate the dominant account profile classification model, wherein the training data is partitioned into a first portion and a second portion;

generating a first output from the dominant account profile classification model based on the subset of the set of transaction variables and the first portion of the training data;

generating a second output from the dominant account profile classification model based on the subset of the set of transaction variables and the second portion of the training data; and validating the dominant account profile classification model by matching the first output and the second output from the dominant account profile classification model;

determining a plurality of prediction scores for the particular account based on the dominant account profile classification model and the transaction data, wherein determining the plurality of prediction scores comprises:

determining, for the user, a prediction score for each dominant account profile of a plurality of dominant account profiles, wherein the prediction score for a dominant account profile comprises a prediction of whether the user will conduct the threshold value of payment transactions using the particular account in the one or more payment transaction categories of the plurality of payment transaction categories; and determining a highest prediction score of the plurality of prediction scores for the plurality of dominant account profiles, wherein the highest prediction score corresponds to a recommended dominant account profile of the plurality of dominant account profiles for the particular account;

generating at least one report associated with the recommended dominant account profile of the plurality of dominant account profiles for the particular account based on determining the recommended dominant account profile;

communicating the at least one report based on generating the at least one report;

determining, a location of the user based on: location data received from a GPS equipped user device, an on line search of the user at the user device, and the transaction data associated with the plurality of payment transactions involving the user;

determining merchant identity data associated with a merchant located within a predetermined distance from the determined location of the user;

generating an offer of the merchant based on determining that the prediction score of the recommended dominant account profile satisfies a threshold value of the prediction score;

transmitting the offer to the user based on the determined merchant identity data and the recommended dominant account profile;

generating a new training data based on whether the user conducted the payment transaction using the particular account associated with the user based on the offer within the predetermined time interval; and updating the dominant account profile classification model based on the new training data.

7. The system of claim 6, wherein the dominant account profile classification model comprises a multinomial classification model.

8. The system of claim 6, wherein the plurality of dominant account profiles comprises:

a first dominant account profile associated with the first payment transaction category, the first payment transaction category comprising a first threshold value of payment transactions conducted during the predetermined time interval using a card-not-present payment channel independent of one or more merchant categories, a second dominant account profile associated with the second payment transaction category, the second payment transaction category comprising a second threshold value of payment transactions conducted during the predetermined time interval in a fuel merchant category, a food and grocery merchant category, a telecommunications and utilities merchant category, a quick service restaurant (QSR) merchant category, and a drug store and pharmacy merchant category, a third dominant account profile associated with the third payment transaction category, the third payment transaction category comprising a third threshold value of payment transactions conducted during the predetermined time interval in a restaurants merchant category, an apparel and accessories merchant category, a discount store merchant category, a department store merchant category, a retail goods merchant category, an entertainment merchant category, and an electronics merchant category, a fourth dominant account profile associated with a fourth payment transaction category, the fourth payment transaction category comprising a fourth threshold value of payment transactions conducted during the predetermined time interval in a transportation merchant category, a lodging merchant category, a travel services merchant category, an airlines merchant category, and a vehicle rental merchant category, and a fifth dominant account profile associated with a fifth payment transaction category, the fifth payment transaction category comprising a fifth threshold value of payment transactions conducted during the predetermined time interval in a health care merchant category, an education and government merchant category, a retail services merchant category, an automotive merchant category, a professional services merchant category, a business to business merchant category, a direct marketing merchant category, and a wholesale club merchant category.

9. The system of claim 6, wherein the transaction data is first transaction data associated with a first plurality of payment transactions, and wherein the at least one processor is further configured for:

determining second transaction data associated with a second plurality of payment transactions involving the plurality of accounts of a plurality of users;

segmenting the second plurality of payment transactions into one or more dominant account profiles of the plurality of dominant account profiles based on the transaction data associated with the second plurality of payment transactions; and identifying a dominant account profile for each account of the plurality of accounts based on segmenting the second plurality of payment transactions into the one or more dominant account profiles of the plurality of dominant account profiles.

10. The system of claim 6, wherein the predetermined time interval after activation of the debit account is 30 days.

11. A computer program product for determining and validating a dominant account profile classification model by matching first and second training data, the computer program product comprising at least one non-transitory computer-readable medium including instructions that, when executed by at least one processor, cause the at least one processor to perform a plurality of functions comprising:

conducting, at a plurality of points of sale, transaction data without initially using any dominant account profile by associating account identifiers with tokens stored in one or more data structures;

receiving the transaction data;

associating the transaction data with a plurality of payment transactions conducted by a user within a predetermined time interval after activation of a debit account involved in the plurality of payment transactions;

generating a dominant account profile classification model, wherein the dominant account profile classification model is configured to provide an output that includes a prediction as to whether the user will use a particular account associated with the user to conduct a threshold value of payment transactions in one or more payment transaction categories of a plurality of payment transaction categories during the predetermined time interval, and wherein generating the dominant account profile classification model comprises:

processing the transaction data to obtain training data for the dominant account profile classification model, wherein processing the transaction data comprises:

determining a set of transaction variables based on the transaction data, wherein the set of transaction variables comprises at least one of:

a first account activation variable associated with whether a first account of the user was involved in a first payment transaction conducted in a first payment transaction category, a second account activation variable associated with a specific number of the plurality of payment transaction categories in which a second payment transaction involving a second account of the user was conducted, a third account activation variable associated with a first number of payment transactions involving a third account of the user in a second payment transaction category, a fourth account activation variable associated with a first transaction volume of the plurality of payment transactions involving a fourth account of the user in a third payment transaction category, a fifth account activation variable associated with a determination of whether a fifth account of the user was involved in a first type of payment transaction, a sixth account activation variable associated with a second number of payment transactions involving a sixth account of the user based on a second type of payment transaction, a seventh account activation variable associated with a second transaction volume of the plurality of payment transactions involving a seventh account of the user based on a third type of payment transaction, an eighth account activation variable associated with a determination of whether an eighth account of the user was involved in a particular payment transaction during a first time interval, the eighth account activation variable associated with a third number of payment transactions involving the eighth account of the user during the first time interval, a ninth account activation variable associated with a third transaction volume associated with the plurality of payment transactions involving a ninth account of the user during a second time interval, a tenth account activation variable associated with a determination of whether a tenth account of a plurality of accounts of the user was involved in a specific payment transaction, an eleventh account activation variable associated with a fourth number of payment transactions involving an eleventh account of the plurality of accounts of the user as compared to a fifth number of payment transactions involving the plurality of accounts of the user, a twelfth account activation variable associated with a fourth transaction volume of the plurality of payment transactions involving the plurality of accounts of the user, or any combination thereof;

storing the dominant account profile classification model in the one or more data structures;

identifying a subset of the set of the transaction variables for determining a probability that the user will conduct the threshold value of the payment transactions; and changing the transaction data into a format to be analyzed to generate the dominant account profile classification model, wherein the training data is partitioned into a first portion and a second portion;

generating a first output from the dominant account profile classification model based on the subset of the set of transaction variables and the first portion of the training data;

generating a second output from the dominant account profile classification model based on the subset of the set of transaction variables and the second portion of the training data; and validating the dominant account profile classification model by matching the first output and the second output from the dominant account profile classification model;

determining a plurality of prediction scores for the particular account based on the dominant account profile classification model and the transaction data, wherein determining the plurality of prediction scores comprises:

determining, for the user, a prediction score for each dominant account profile of a plurality of dominant account profiles, wherein the prediction score for a dominant account profile comprises a prediction of whether the user will conduct the threshold value of payment transactions using the particular account in the one or more payment transaction categories of the plurality of payment transaction categories; and determining a highest prediction score of the plurality of prediction scores for the plurality of dominant account profiles, wherein the highest prediction score corresponds to a recommended dominant account profile of the plurality of dominant account profiles for the particular account;

generating at least one report associated with the recommended dominant account profile of the plurality of dominant account profiles for the particular account based on determining the recommended dominant account profile;

communicating the at least one report based on generating the at least one report;

determining a location of the user based on: location data received from a GPS equipped user device, an on line search of the user at the user device, and the transaction data associated with the plurality of payment transactions involving the user;

determining merchant identity data associated with a merchant located within a predetermined distance from the determined location of the user;

generating an offer of the merchant based on determining that the prediction score of the recommended dominant account profile satisfies a threshold value of the prediction score;

transmitting the offer to the user based on the determined merchant identity data and the recommended dominant account profile;

generating a new training data based on whether the user conducted the payment transaction using the particular account associated with the user based on the offer within the predetermined time interval; and updating the dominant account profile classification model based on the new training data.

12. The computer program product of claim 11, wherein the dominant account profile classification model comprises a multinomial classification model.

13. The computer program product of claim 11, wherein the plurality of dominant account profiles comprises:
   a first dominant account profile associated with the first payment transaction category, the first payment transaction category comprising a first threshold value of payment transactions conducted during the predetermined time interval using a card-not-present payment channel independent of one or more merchant categories,
   a second dominant account profile associated with the second payment transaction category, the second payment transaction category comprising a second threshold value of payment transactions conducted during the predetermined time interval in a fuel merchant category, a food and grocery merchant category, a telecommunications and utilities merchant category, a quick service restaurant (QSR) merchant category, and a drug store and pharmacy merchant category,
   a third dominant account profile associated with the third payment transaction category, the third payment transaction category comprising a third threshold value of payment transactions conducted during the predetermined time interval in a restaurants merchant category, an apparel and accessories merchant category, a discount store merchant category, a department store merchant category, a retail goods merchant category, an entertainment merchant category, and an electronics merchant category,
   a fourth dominant account profile associated with a fourth payment transaction category, the fourth payment transaction category comprising a fourth threshold value of payment transactions conducted during the predetermined time interval in a transportation merchant category, a lodging merchant category, a travel services merchant category, an airlines merchant category, and a vehicle rental merchant category, and
   a fifth dominant account profile associated with a fifth payment transaction category, the fifth payment transaction category comprising a fifth threshold value of payment transactions conducted during the predetermined time interval in a health care merchant category, an education and government merchant category, a retail services merchant category, an automotive merchant category, a professional services merchant category, a business to business merchant category, a direct marketing merchant category, and a wholesale club merchant category.

14. The computer program product of claim 11, wherein the transaction data is first transaction data associated with a first plurality of payment transactions, and wherein the instructions, when executed by the at least one processor, further cause the at least one processor to perform:
   determining second transaction data associated with a second plurality of payment transactions involving the plurality of accounts of a plurality of users;
   segmenting the second plurality of payment transactions into one or more dominant account profiles of the plurality of dominant account profiles based on the transaction data associated with the second plurality of payment transactions; and
   identifying a dominant account profile for each account of the plurality of accounts based on segmenting the second plurality of payment transactions into the one or more dominant account profiles of the plurality of dominant account profiles.

15. The computer program product of claim 11, wherein the predetermined time interval after activation of the debit account is 30 days.

* * * * *

UNITED STATES PATENT AND TRADEMARK OFFICE
CERTIFICATE OF CORRECTION

| | |
|---|---|
| PATENT NO. | : 11,704,684 B2 |
| APPLICATION NO. | : 16/959564 |
| DATED | : July 18, 2023 |
| INVENTOR(S) | : Varun Verma et al. |

It is certified that error appears in the above-identified patent and that said Letters Patent is hereby corrected as shown below:

In the Claims

Column 35, Line 2, Claim 1, delete "accounts the of" and insert -- accounts of the --

Column 36, Line 4, Claim 1, delete "identity and" and insert -- identity data and --

Column 39, Line 19, Claim 6, delete "determining," and insert -- determining --

Signed and Sealed this
Fifth Day of September, 2023

Katherine Kelly Vidal
*Director of the United States Patent and Trademark Office*